United States Patent
Kalsi et al.

(10) Patent No.: US 12,487,856 B2
(45) Date of Patent: Dec. 2, 2025

(54) POINT CLOUD ADJACENCY-MAP AND HASH-MAP ACCELERATOR

(71) Applicant: Intel Corporation, Santa Clara, CA (US)

(72) Inventors: Gurpreet S. Kalsi, Bangalore (IN); Om Ji Omer, Bangalore (IN); Prashant Laddha, Bengaluru (IN); Kamlesh R. Pillai, Bangalore (IN); Anirud Thyagharajan, Bengaluru (IN); Meenal Kudalkar, Bangalore (IN); Krishnan Ananthanarayanan, Palakkad (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 18/049,509

(22) Filed: Oct. 25, 2022

(65) Prior Publication Data

US 2023/0161626 A1  May 25, 2023

(30) Foreign Application Priority Data

Nov. 24, 2021 (IN) ............................ 202141054174

(51) Int. Cl.
  *G06F 9/50* (2006.01)
  *G06T 1/60* (2006.01)
(52) U.S. Cl.
  CPC .............. *G06F 9/5027* (2013.01); *G06T 1/60* (2013.01)

(58) Field of Classification Search
  CPC . G06F 9/5027; G06T 1/60; G06T 1/20; G06T 15/005; G06T 2207/10028
  See application file for complete search history.

(56) References Cited

U.S. PATENT DOCUMENTS

| | | | | |
|---|---|---|---|---|
| 2016/0139919 A1* | 5/2016 | Evans | ................ | G06F 9/30038 712/209 |
| 2016/0139929 A1* | 5/2016 | Evans | ................ | G06F 9/30036 712/208 |

OTHER PUBLICATIONS

Extended European Search Report from European Patent Application No. 22202909.2 notified May 2, 2023, 8 pgs.
Park, Gwangtae, et al., "A 1.15 TOPS/W Energy-Efficient Capsule Network Accelerator for Real-Time 3D Point Cloud Segmentation in Mobile Environment", IEEE Transactions on Circuits and Systems—II: Express Briefs, vol. 67, No. 9, Sep. 2020, 5 pgs.
Rheindt, Sven, et al., "NEMESYS: Near-Memory Graph Copy Enhanced System-Software", 2019 Proceedings of the International Symposium on Memory Systems, 16 pgs.
Xu, Yi , et al., "Multi-scale Voxel Hashing and Efficient 3D Representation for Mobile Augmented Reality", 2018 IEEE/CVF Conference on Computer Vision and Pattern Recognition Workshops, 8 pgs.

(Continued)

*Primary Examiner* — Chong Wu
(74) *Attorney, Agent, or Firm* — Essential Patents Group, LLP

(57) ABSTRACT

An embodiment of an apparatus comprises a hardware accelerator to perform a three-dimensional (3D) point cloud data access operation, and circuitry coupled to the hardware accelerator to control the hardware accelerator to perform the 3D point cloud data access operation in response to a request. Other embodiments are disclosed and claimed.

14 Claims, 17 Drawing Sheets

(56) References Cited

OTHER PUBLICATIONS

Ye, Chencheng, et al., "Hardware-Based Address-Centric Acceleration of Key-Value Store", 2021 IEEE International Symposium on High-Performance Computer Architecture (HPCA), 13 pgs.

"Class template unordered_map", <https://www.boost.org/doc/libs/1_69_0/doc/html/boost/unordered_map.html> accessed Sep. 29, 2021, 16 pgs.

Ankerl, Martin, "Robin hood hashing", <https://github.com/martinus/robin-hood-hashing> accessed Sep. 29, 2021, 4 pgs.

Chen, Xiaozhi, et al., "Multi-View 3D Object Detection Network for Autonomous Driving", Proceedings of the IEEE Conference on Computer Vision and Pattern Recognition, 2017, 9 pgs.

Choy, Christopher, et al., "4D Spatio-Temporal ConvNets: Minkowski Convolutional Neural Networks", airXiv preprint airXiv:1904.08755, 2019, 21 pgs.

Dai, Angela, et al., "ScanNet: Richly-annotated 3D Reconstructions of Indoor Scenes", Proceedings of the IEEE Conference on Computer Vision and Pattern Recognition, 2017, 22 pgs.

G. Inc., "Google sparse hash", <https://github.com/sparsehash/sparsehash> accessed Sep. 29, 2021, 4 pgs.

Garbade, Martin, et al., "Two Stream 3D Semantic Scene Completion", Proceedings of the IEEE Conference on Computer Vision and Pattern Recognition Workshops, 2019, 14 pgs.

Graham, Benjamin, et al., "3D Semantic Segmentation with Submanifold Sparse Convolutional Networks", Proceedings of the IEE Conference on Computer Vision and Pattern Recognition, 2018, 11 pgs.

Li, Jie, et al., "RGBD Based Dimensional Decomposition Residual Network for 3D Semantic Scene Completion", Proceedings of the IEEE Conference on Computer Vision and Pattern Recognition, 2019, 10 pgs.

Liu, Shice, et al., "See and Think: Disentangling Semantic Scene Completion", Advances in Neural Information Processing Systems, 2018, 12 pgs.

Omer, Om Ji, et al., "AccSS3D: Accelerator for Spatially Sparse 3D DNNs", arXiv.2011.12669v1 [cs.AR], Nov. 25, 2020, 13 pgs.

Prakhya, Sai Manoj, et al., "B-Shot: A Binary Feature Descriptor for Fast and Efficient Keypoint Matching on 3D Point Clouds", 2015 IEEE/RSJ International Conference on Intelligent Robots and Systems (IROS), 6 pgs.

Rusu, Radu Bogdan, et al., "Fast Point Feature Histograms (FPFH) for 3D Registration", 2009 IEEE International Conference on Robotics and Automation, 6 pgs.

Schmohl, S., et al., "Submanifold Sparse Convolutional Networks for Semantic Segmentation of Large-Scale ALS Point Clouds", ISPRS Annals of Photogrammetry, Remote Sensing and Spatial Information Sciences, vol. IV-2/W5, 2019, 8 pgs.

Zhang, Pingping, et al., "Cascaded Context Pyramid for Full-Resolution 3D Semantic Scene Completion", Proceedings of the IEEE International Conference on Computer Vision, 2019, 10 pgs.

\* cited by examiner

DATA BUFFER ARRANGEMENT AS PER LEVELS OF THE VOXEL GRID REPRESENTATION

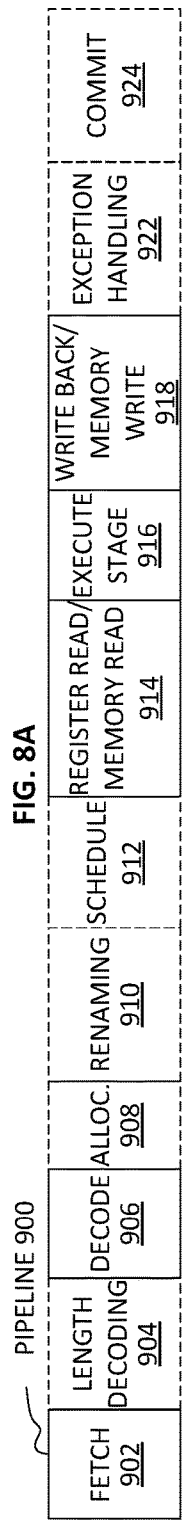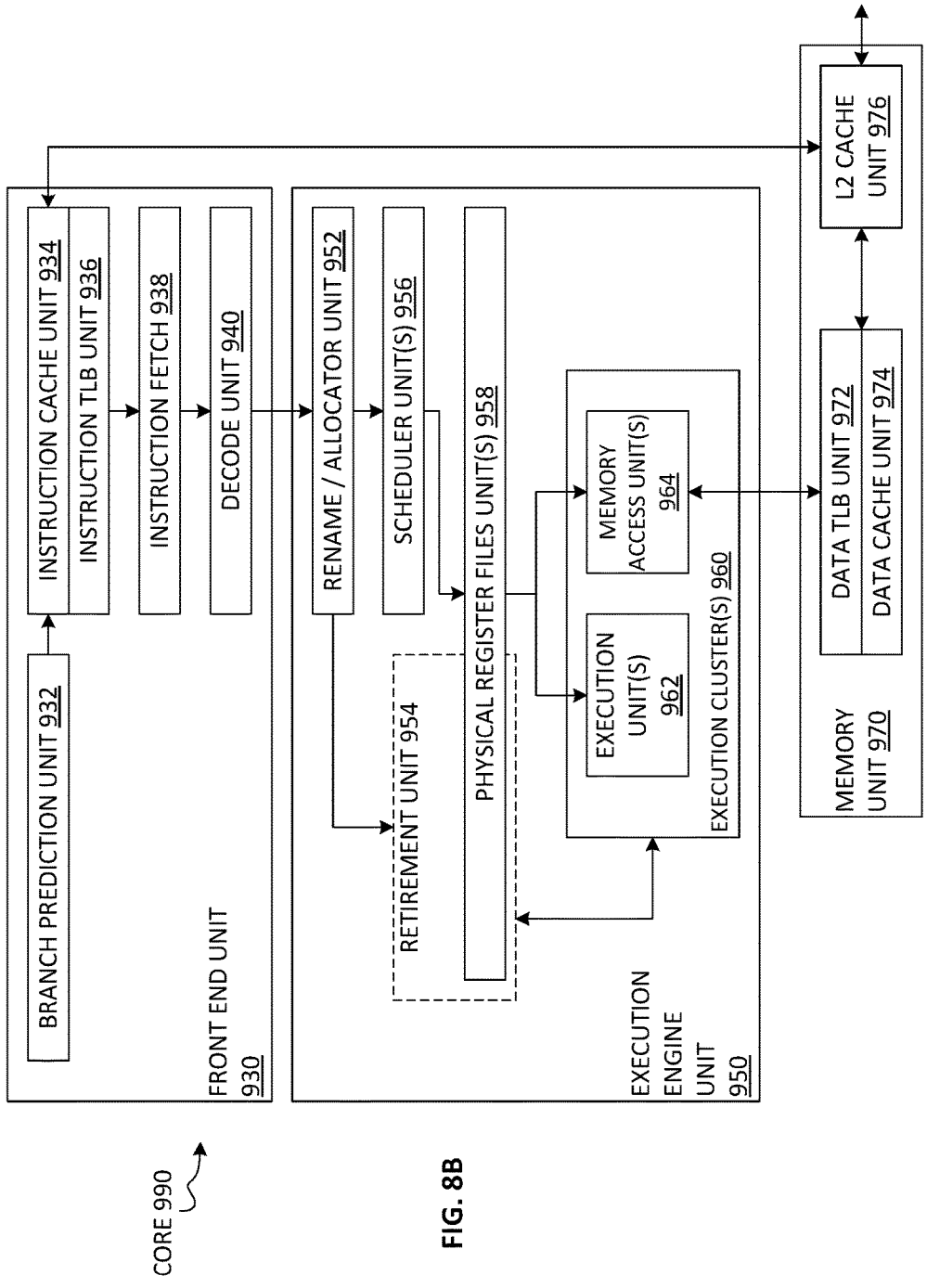

POINT CLOUD ADJACENCY-MAP AND HASH-MAP ACCELERATOR

CLAIM FOR PRIORITY

This application claims the benefit of priority to Indian Patent Application No. 202141054174, filed on Nov. 24, 2021, titled "POINT CLOUD ADJACENCY-MAP AND HASH-MAP ACCELERATOR" and which is incorporated by reference in entirety.

BACKGROUND

1. Technical Field

This disclosure generally relates to accelerator technology, and more particularly to an instruction set for a hardware accelerator.

2. Background Art

Understanding three-dimensional (3D) geometry and semantics of a scene is essential to many real-world systems including but not limited to autonomous driving, robotics, remote sensing, augmented reality (AR)/virtual reality (VR), medical treatment, etc. Also, advancements in 3D sensing technologies, such as radar, light detection and ranging (LiDAR), depth cameras, etc., enable high-quality 3D data generation at affordable cost and in desirable form-factors. 3D data is usually represented in various formats such as point clouds, meshes, depth maps and volumetric grids. Deep learning (DL) techniques have found application in domains such as computer vision, speech processing and machine translation that operate over images, videos, audio, text and other forms of data.

BRIEF DESCRIPTION OF THE DRAWINGS

The various embodiments of the present invention are illustrated by way of example, and not by way of limitation, in the figures of the accompanying drawings and in which:

FIG. 8A is a block diagram illustrating both an exemplary in-order pipeline and an exemplary register renaming, out-of-order issue/execution pipeline according to embodiments of the invention;

FIG. 8B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
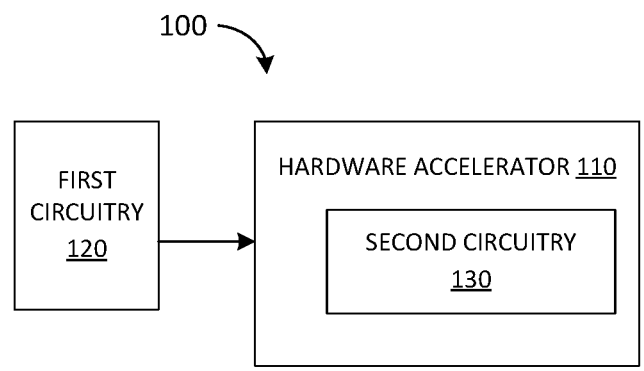
FIG. 1 is a block diagram of an example of an apparatus according to an embodiment.

Embodiments discussed herein variously provide techniques and mechanisms for a microarchitecture and instruction set for point cloud adjacency-map and hash-map creation. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide a point cloud adjacency-map and hash-map creation accelerator. Example applications for embodiments include drones, autonomous driving, AR/VR headsets, etc.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—e.g. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide a microarchitecture and instruction set for point cloud adjacency-map and hash-map creation. 3D data processing in many applications that exploit geometric cues (e.g., such as artificial intelligence (AI), machine learning (ML), deep neural network (DNN), graphics, etc.), gather details about neighborhood structure (e.g., nearby voxels) in form of metadata. During processing, a pre-built neighborhood structure provides fast access to unstructured 3D data often present in off-die memory with high latency overhead. As the dimensionality of an input space grows (e.g., from two-dimensional (2D) to 3D), the complexity of the data-structure increases. Some systems may manage the complexity with a sparse hash-map. In a 3D volume space, a volume element may be referred to as a "voxel." To minimize the overhead of voxel data accesses (e.g., frequent accesses to the hash-map), some systems may create an adjacency map. For example, the adjacency map may be a metadata structure, sometimes referred to as a "rulebook," that comprises lists of input and output voxel pairs that participate in a 3D sparse convolution operation. Adjacency map creation may involve accessing multi-gigabytes of unstructured data, finding the active neighbors, and then defining the adjacency map, which adds to latency and processing power.

For example, a DNN-based 3D scene segmentation pipeline may start with depth scans from a red-green-blue depth (RGB-D) camera or LiDAR that go through voxel quantization (e.g., downscaling and/or discretizing into a voxel grid of fixed resolution) to create an occupancy map. The occupancy map may then go through a scene segmentation software (SW) flow to apply voxel-wise labels and semantic segmentation to the occupancy map. For example, the scene segmentation SW flow may include spare hash-map creation (e.g., creating a list of active (occupied) voxels for processing), followed by rulebook preparation (e.g., spatial correspondences between map indices for convolution), and then DNN inference (e.g., layer variants of sparse convolution (SCN), downsampling, and upsampling. The sparse hash-map creation and rulebook preparation create the rulebook metadata before the DNN processing. In an example system (e.g., on an INTEL-i7-8700K central processor unit (CPU)), creating the rulebook metadata for a sample point cloud from the ScanNet dataset, having 140,000 points, may take more than 100 milliseconds (ms). Performing visual analytics in real-time, however, may benefit from faster metadata creation (e.g., in a few or several milliseconds).

An example CPU and graphic processor unit (GPU) based system for 3D spatially sparse convolutions may exploit the spatial sparsity in input data. For example, the system may store only the active voxels in the 3D volume using a hash-map. Then, to perform convolution at output voxels, the system may fetch only the active input voxels present in the receptive field and multiply the fetched voxels with respective filter weights based on the input voxel positions in the receptive field. The hash-maps use the 3D coordinate (x, y, z) of the voxel as a key and a memory index as a value. The lists of input-output voxel indices participating in the 3D sparse convolution operation is stored as metadata (e.g., a rulebook). Each list corresponds to a weight plane (e.g., for a 3×3×3 convolution there could be up to 27 weight planes). The rulebook is created by querying the hash-map for all possible neighboring voxel coordinates (e.g., 27 locations for 3×3×3 filter).

Table 1 shows how input point cloud data is stored randomly (e.g., in dynamic random access memory (DRAM)), where a number of active voxels=N*m, a voxel ID is Vi, m=a number of voxels per word, and (x,y,z) is a voxel spatial position. However, the application computation pipeline requires access to neighboring active voxels for every input voxel.

TABLE 1

| 0 | V1(x, y, z), . . . , Vm(x, y, z) |
| | Vm + 1(x, y, z), . . . , V2m(x, y, z) |
| | Multi-gigabyte active voxel |
| | (spatial position) |
| N | V(n − 1)m(x, y, z), , ., Vnm(x, y, z) |

Table 2 shows an example of a few lines of a rulebook (RB) point cloud data format for processing. The rulebook encodes a relationship between point cloud data, and creating the rulebook may involve substantial CPU time and resources, which may be a bottleneck for latency critical systems.

TABLE 2

| RB Line | Output voxel | <– Weight mask –> | Output features |
|---|---|---|---|
| 14 | OV-1 | 101011 - - - 110 | V6; V9; V10; V15; V23; V26 |
| 15 | OV-2 | 001010 - - - 001 | V1; V10; V13 |
| 16 | OV-3 | 100010 - - - 000 | V0; V1; V10; V13; V26 |

As shown in Table 2, an example rulebook may include multiple rulebook lines (e.g., indicate by the RB Line column). OV-1, OV-2, and OV-3 are output voxels. The bolded columns in the weight mask field (e.g., leftmost columns, third from left column, and rightmost column) correspond to neighbor information. The output features include active neighbor memory addresses. As noted above, rulebook metadata creation may be used for lessening end-to-end latency in real-time applications. Rulebook metadata includes input voxel to neighboring active voxel mapping along with the voxels' position in memory.

Some conventional hash-map implementations include GOOGLE sparse hash, robin hood hash, and boost unordered map. One design trade-off for a hash-map implementation is to select a flat or a node-based data layout. The flat data layout is preferred for faster insertion/accesses because the flat data layout does not involve node indirections. However, with the flat data layout, as the number of entries in the hash-map crosses a load factor, the hash-map needs to be resized which results in allocation spikes and significant data shuffling. To avoid frequent resizing, the memory for flat arrays may be allocated based on estimates of typical use cases. Such allocation may lead to over/under allocations for other use cases. On the other hand, a node-based data layout for a hash-map cannot provide fast and predictable insertion/access times due to node indirections and variable lengths of a probe sequence.

Accessing a large set of 3D point cloud data stored in DRAM in a random order poses execution latency and energy challenges for edge to exa-scale compute devices. To create metadata with a conventional scene segmentation software, the hash-map needs to be queried for all possible neighbors (e.g., 27 times for a 3×3×3 filter) because the neighbor search and hash-maps are typically in separate functional blocks. The dynamic resizing of the hash-map may also lead to significant data movements, leading to latency spikes as well as more energy dissipation. Some embodiments overcome one or more of the foregoing problems.

Some embodiments provide a hardware accelerator and/or an instruction set for efficient execution in a CPU/GPU/accelerator architecture for a N-dimensional to one-dimensional hash-map creation and metadata generation, where N>1. Some embodiments provide technology to accelerate accessing point cloud data using a hardware accelerator. Embodiments of the hardware accelerator utilize a 3D data format aware hashing technique for memory banking, and hierarchical metadata storage for faster access of active voxel grids. Embodiments of the hardware accelerator also include technology to create an adjacency map that may be utilized for multi-dimensional visual analytics. Embodiments of the hardware accelerator include a microarchitecture that accelerates the creation of suitable metadata for visual analytics.

A variety of application involve frequent lookup of neighbor voxels. Non-limiting examples of applications that may make beneficial use of embodiments of the hardware accelerator and instruction set described herein include 3D AI applications, 3D graphics applications, normal estimation applications, estimation of several point cloud descriptors (e.g., fast point feature histograms (FPFHs)), determining a binary feature descriptor for fast and efficient keypoint matching on 3D point clouds (e.g., B-SHOT), etc.), performing a correspondence search between voxel grids for registration, performing spatial neighbor searches, 3D voxel/point traversal based techniques for segmentation (e.g., graph cut-based methods, connected component labelling approaches), voxel integration procedures, ray tracing implementations (e.g., that can be accelerated using neighbor lists), etc.

With reference to FIG. 1, an embodiment of an apparatus 100 may include a hardware accelerator 110 to perform a 3D point cloud data access operation, and first circuitry 120 coupled to the hardware accelerator 110 to control the hardware accelerator 110 to perform the 3D point cloud data access operation in response to a request. In some embodiments, the request may stem from instructions decoded by a processor/core. In some embodiments, the hardware accelerator 110 includes second circuitry 130 to provide N-dimension to one-dimension hash-map creation and metadata generation for the 3D point cloud data, where N is greater than one. For example, the second circuitry 130 may be configured to create a hash-map with memory banks based on a format of the 3D point cloud data. The second circuitry 130 may also be configured to create hierarchical metadata storage for voxels and create an adjacency map metadata for multi-dimensional visual analytics.

In some embodiments, the first circuitry 120 may be configured to perform a hash-map computation operation with the hardware accelerator 110 based on a list of voxels and configuration information indicated by the request and store an output hash-map from the hardware accelerator at an address indicated by the request. The first circuitry 120 may also be configured to perform a rulebook metadata computation operation with the hardware accelerator based on a list of voxels, a hash-map, and configuration information indicated by the request, and store output rulebook information from the hardware accelerator at an address indicated by the request. The first circuitry 120 may also be configured to perform a rulebook adjacency map computation operation with the hardware accelerator based on a list of voxels, a hash-map, and configuration information indicated by the request, and store output rulebook information from the hardware accelerator at an address indicated by the request.

Figure 2:
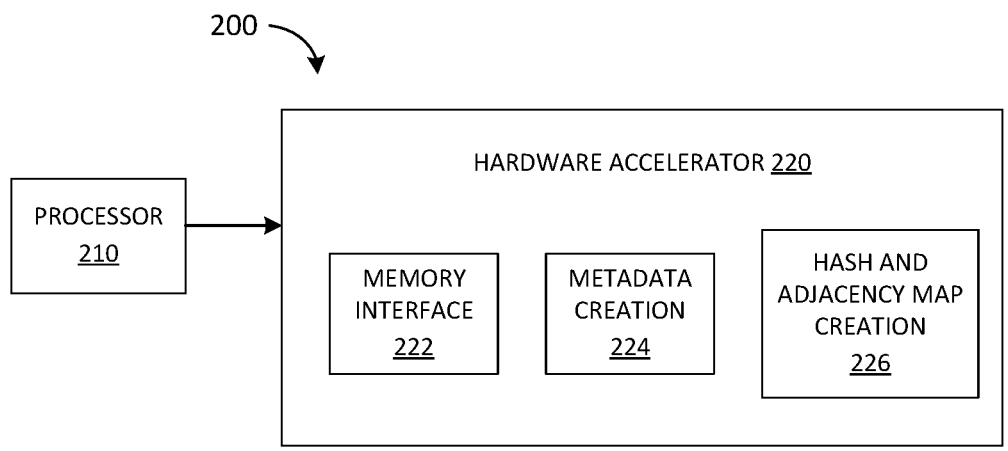
FIG. 2 is a block diagram of another example of an apparatus according to an embodiment.

With reference to FIG. 2, an embodiment of an apparatus 200 may include a processor 210 coupled to a hardware accelerator 220. Some embodiments of the hardware accelerator 220 include circuitry to provide 1) support for a hierarchical metadata structure to efficiently locate an active voxel region; 2) hashing techniques for banking the metadata for faster access to neighborhood voxels; and/or 3) techniques to create an adjacency-map which is utilized for computation of the sparse data. The hardware accelerator 220 may be physically and/or logically organized as one or more modules or blocks including a block 222 to provide a memory interface, a block 224 for metadata creation, and a block 226 for hash and adjacency map creation. For example, the block 224 may include circuitry for hierarchical metadata creation. The block 226 for adjacency-map creation may further include circuitry for neighbor address generation that implements bank hashing and instances of a first-in first-out (FIFO) storage block that may be in accordance with a hashing technique (e.g., to further help achieve parallelism).

The processor 210 may be configured to control an operation of the hardware accelerator 220. For example, the processor 210 may set up how the hardware accelerator 220 operates through various configuration requests. The processor 210 may then control the various computations performed by the hardware accelerator 220 through various requests for such computations. In some embodiments, an instruction set for the processor 210 may include specific instructions for configuration and operation of the hardware accelerator 220. For example, some embodiments may provide instructions to enable and configure the hardware accelerator for hash-map and metadata creation. Embodiments of such instructions may indicate control information along with addresses of source and intermediate data.

Figure 3:
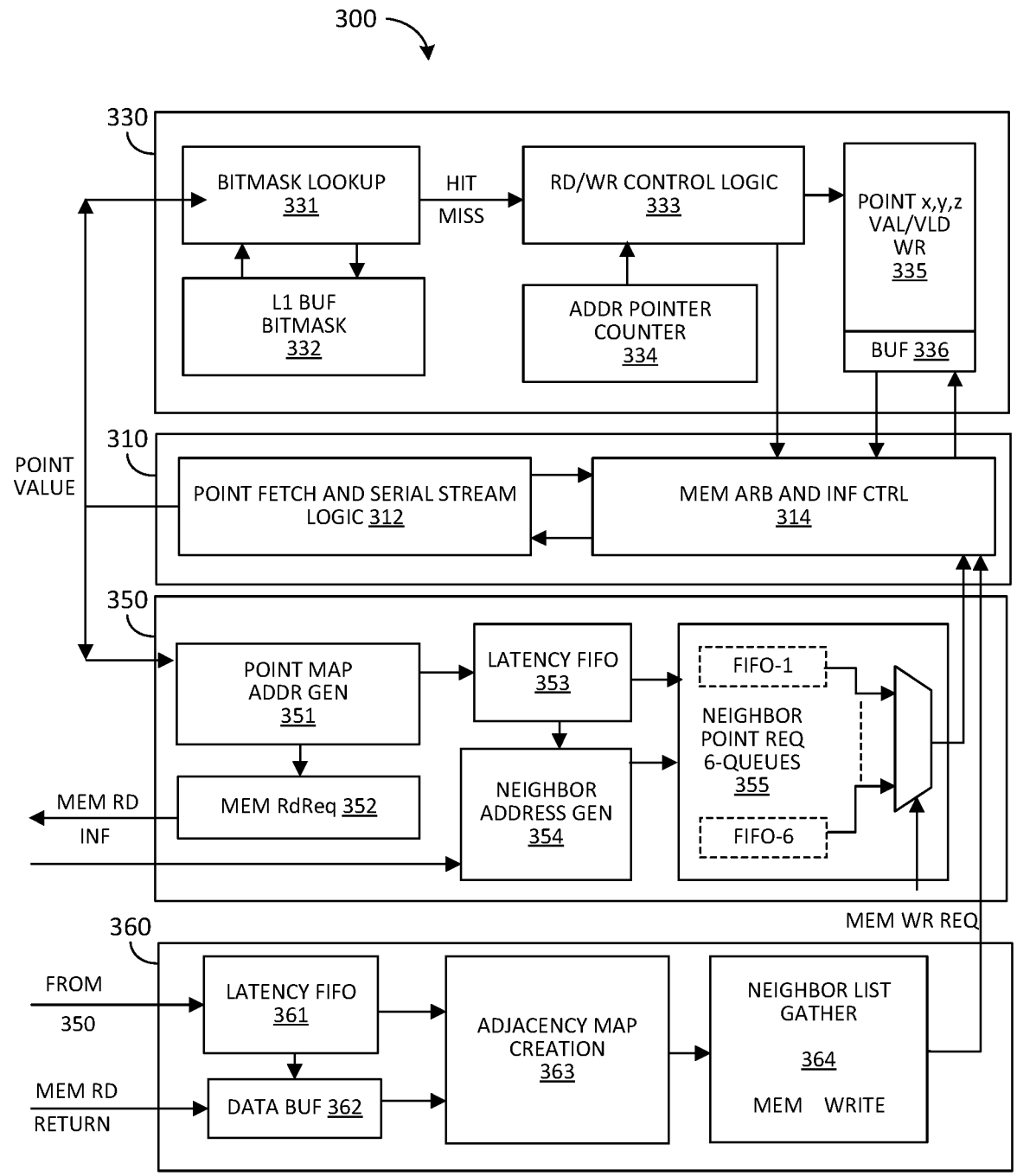
FIG. 3 is a block diagram of an example of a hardware accelerator according to an embodiment.

With reference to FIG. 3, an embodiment of an adjacency-map and metadata hardware accelerator (AdMAC) 300 may include a microarchitecture that is logically and/or physically organized as one or more modules or blocks of logic/circuitry for sparse hash creation and neighbor list creation. Embodiments of the AdMAC 300 includes a block 310 for memory interface logic, a block 330 for metadata creation logic, and blocks 350 and 360 for smart hash and adjacency-map creation logic. As illustrated in FIG. 3, input voxels are represented by coordinates (x,y,z) that are stored in the memory.

The block 310 includes a block 312 for point fetch and serial stream logic, and a block 314 for memory arbitration and interface control, coupled as shown.

The block 330 includes a block 331 for a bitmask lookup, a block 332 for a L1 buffer bitmask, a block 333 for read/write control logic, a block 334 for an address pointer counter, a block 335 for a point x,y,z value/valid write logic, and block 336 for a buffer, coupled as shown.

The block 350 includes a block 351 for point map address generation, a block 352 for memory read requests, a block 353 for a latency FIFO, a block 354 for neighbor address generation, and a block 355 for six queues for neighbor point requests, coupled as shown.

The block 360 includes a block 361 for a latency FIFO, a block 362 for a data buffer, a block 363 for adjacency map creation, and a block 364 for neighbor list gather and memory write, coupled as shown.

In an example operation, block 310 fetches points from memory in a serial order and streams them to compute blocks. Sparse hash data is created by block 330; block 330 stores a bitmask 332, encoding the active voxel at higher granularity (e.g., referred to as a voxel group) in a local L1 buffer. Corresponding to every active voxel group, memory space is allocated to store per voxel information (e.g., memory address and active status). Every voxel group, irrespective of its active status has a fixed memory location to store the address of the allocated region. Voxel information is stored in eight banked memory where a bank ID is encoded using y[2], z[1:0] address bits. Within the bank, voxels are hashed so that each read of 64 Bytes (e.g., from DRAM) can provide information for 16 voxels as per y[1:0], x[1:0] addressing. This specific hashing helps in reading 26 neighboring voxels in a single cycle, except for boundary voxels.

Block 330 receives one point per cycle from block 310, and block 330 performs a lookup operation into a local bitmask buffer. Based on a mask bit status, the block 330 either allocates the memory region or fetches an address for a previously allocated region. Sparse hash data (voxel address and active status) is written to memory by block 330 using appropriate byte enables. Block 350 creates a neighbor list for the voxels in memory using the sparse hash created by block 330. Block 350 receives one point per cycle from block 310 and reads the address pointer corresponding to the voxel. Neighbor address generation in block 350 computes addresses required to read all 26 neighboring voxels. The above-noted hashing technique help to reduce the numbers of read operations. For example, for a voxel at position y[1:0], x[1:0]=1,1 only three reads are required to fetch all 26 neighboring voxels. Block 360 arranges voxels as per the neighbors so that block 360 can readily arrange the voxels as per the metadata structure and write the voxels to memory.

Embodiments of the AdMAC 300 may advantageously reduce memory requirements, access time, and/or processing time, thereby providing lower latency and energy reduction. For the ScanNet point cloud dataset with about 140 k points, an embodiment of the AdMAC 300 may complete the metadata creation in several ms (e.g., less than 6 ms), which is substantially faster than comparable metadata creation with a general CPU and SW metadata creation process.

Example of Memory Hashing Based on Voxel Data

As noted above, a variety of computations may involve neighboring voxels data. Embodiments of a multi banked memory hashing technique based on specific memory address fields allows an AdMAC to read neighboring voxels in few cycles. Embodiments of a memory hashing technique in the following format may advantageously reduce voxel read time.

Figure 4:
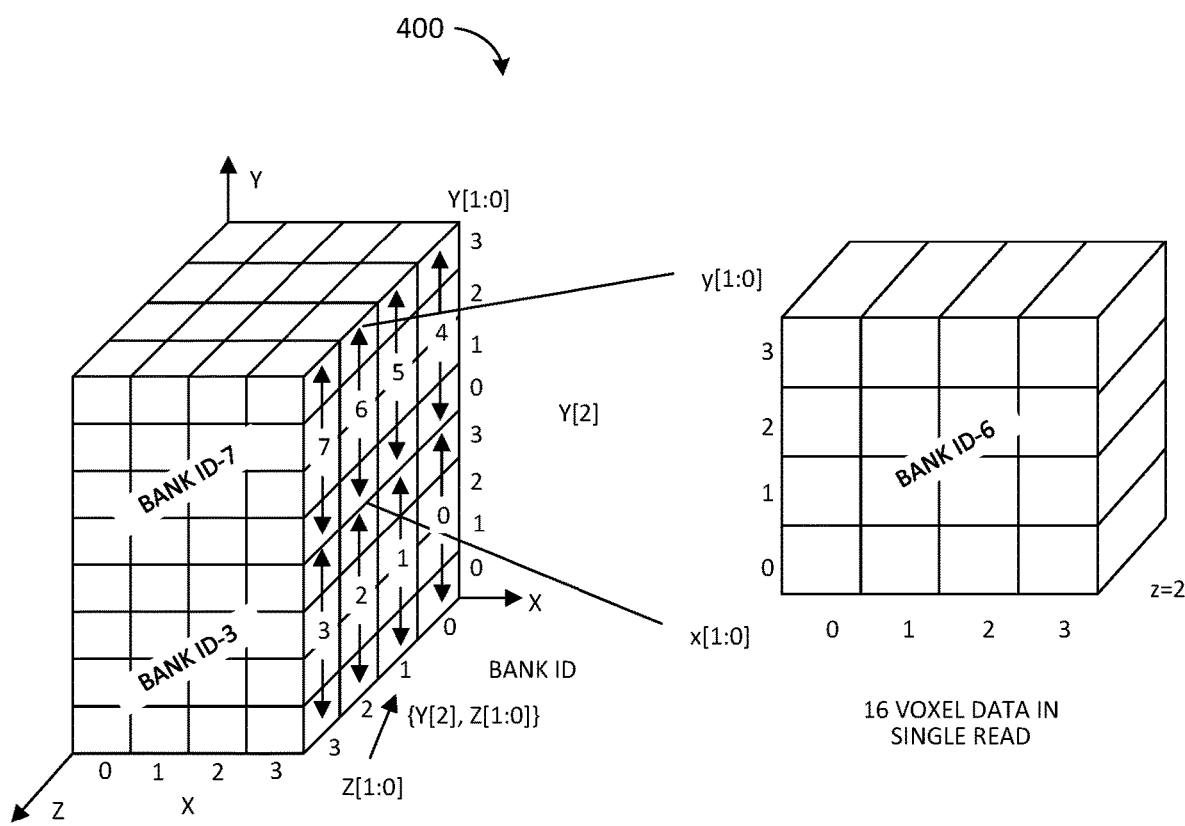
FIG. 4 is a block diagram of an example of a voxel storage structure according to an embodiment.

With reference to FIG. 4, an embodiment of a voxel storage structure 400 includes multiple banks of memory with each bank identified by a bank ID. For example, voxel information is stored in an 8-banked memory where the bank ID is encoded by concatenating the bit value of the third bit position of the y value of the voxel and the bit values of the first and second bit positions of the z value of the voxel (e.g., bank ID={y[2], z[1:0]}). Within the bank, voxels are hashed so that each memory read of 64 bytes can provide information for 16 voxels as per {y[1:0], x[1:0]} addressing. This specific hashing technique helps in reading 26 neighboring voxels in a single cycle, except for boundary voxels. Other embodiments may utilize a similar banking structure based on an available number of banks and throughput requirement (e.g., the hardware may not include resources to read all 26 neighbors together, at a reduced hardware cost).

Examples of a Memory Data Layout

Figure 5A:
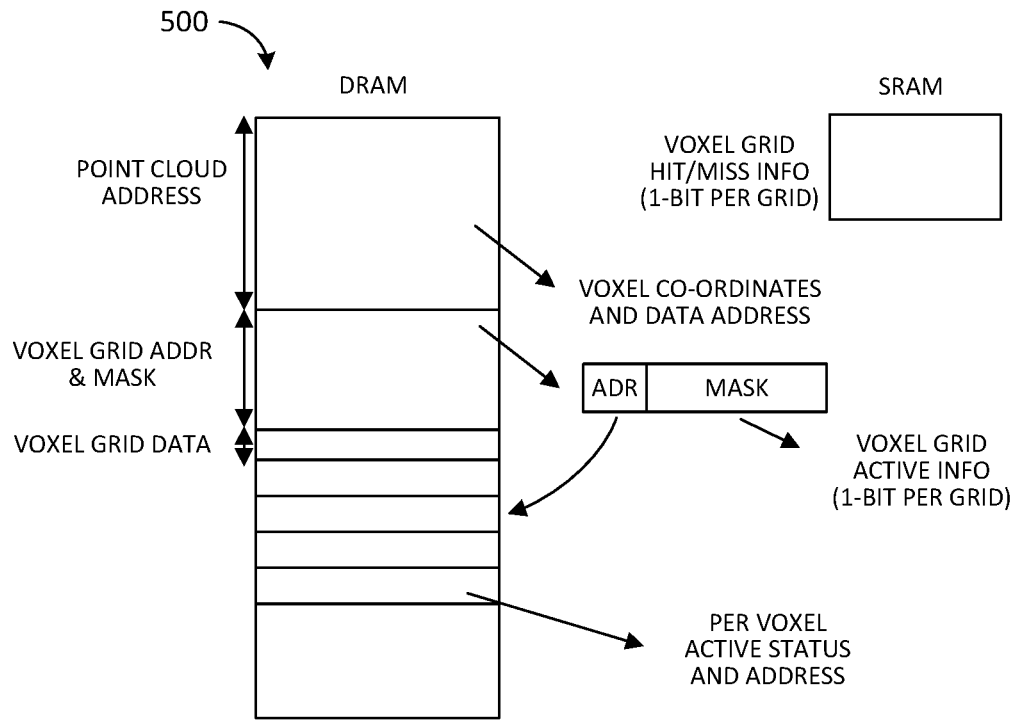
FIG. 5A is a block diagram of an example of a memory data layout according to an embodiment.

With reference to FIG. 5A, an embodiment of a memory data layout 500 shows a memory allocation in DRAM and a corresponding data format. A voxel grid address in DRAM and a corresponding active voxel mask is stored for all the grids that provide the information for a set of voxels. Detailed grid information is stored into a voxel-grid-data segment that represents a per voxel active status and a corresponding address to the data. The detailed grid information may be stored hierarchically and may be proportional to the number of passes through the AdMAC. The number of passes may impact the latency inversely, but also reduces the memory size required.

In some embodiments, the information per voxel grid may be stored in static random-access memory (SRAM) (e.g., in the hardware accelerator 300) to be accessible with lower latency as compared to DRAM. The initial determination of active neighbor voxels may also be done using SRAM. Hierarchical data may also be stored in SRAM, with an increase the SRAM capacity.

Example of a 3D Voxel Grid Hierarchical Representation

Embodiments of a hierarchical metadata storage technique may tune an intermediate representation as per the system memory capacity. For example, intermediate voxel grids may be a cube or cuboid as required by the application. More hierarchies increase the chances of fetching active voxels from DRAM whereas, it costs more to traverse the multiple level data capturing the active grid information.

Table 3 shows an example of how voxels may be represented as hierarchical grids. With the voxel grid level representation, more levels reduce undesired DRAM accesses, but higher SRAM capacity is needed.

TABLE 3

| Level | Voxel Grid Dimension | Number of voxels per grid | Number of voxel grids |
|---|---|---|---|
| L0 | 4K × 4K × 4K | $2^{36}$ | 1 |
| L1 | 1K × 1K × 1K | $2^{30}$ | $2^{6}$ |
| L2 | 256 × 256 × 256 | $2^{24}$ | $2^{12}$ |
| L3 | 64 × 64 × 64 | $2^{18}$ | $2^{18}$ |
| L4 | — (can increase levels to reduce DRAM access) | | |

Figure 5B:
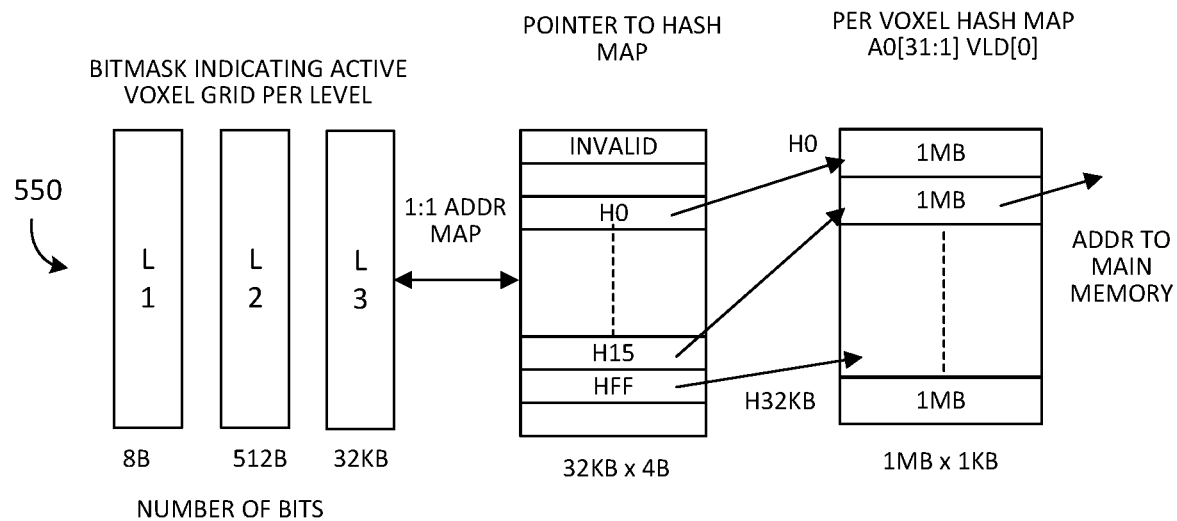
FIG. 5B is a block diagram of an example of a data buffer arrangement according to an embodiment.

With reference to FIG. 5B, an embodiment of a data buffer arrangement 550 shows how a SRAM (local/shared) data buffer may be arranged for multiple levels for faster access of active voxels grids. The memory contains pointers to the hash map and per voxel details.

Examples of an Instruction Set Architecture (ISA) for an AdMAC

Embodiments of an AdMAC may perform the hash-map creation using block 310 and block 330 in FIG. 3. The AdMAC may further perform the metadata creation (e.g., from an earlier developed hash-map) using block 310 and block 350 block in FIG. 3. Embodiments of an AdMAC may be configured as a standalone accelerator (e.g., with a suitable interface and control circuitry). In some embodiments, an AdMAC may be configured as a coprocessor, with a defined set of instructions to drive the AdMAC hardware.

An embodiment of an AdMAC instruction for hash-map creation may have a nominal mnemonic of HASHMAP-COMP. For example, execution of the HASHMAPCOMP instruction may cause a processor to utilize the AdMAC to perform a hash-map computation for spatially sparse data. An example format of the instruction is: HASHMAPCOMP <tsrcdest>, <tsrc1>, <tsrc2>; where tsrcdest is a destination operand that points to an output hash-map base address, tsrc1 is a source operand that represents a base address of an input voxel list, and tsrc2 is a source operand that carries the configuration "RXLN", with 8-bits for each field, where the 'R' field indicates a number of rulebook lines (e.g., multiplied by some constant, such as 1024, 2048, etc.) having a number of voxels indicated by the 'X' field on each x, y, z edge (e.g., also multiplied by some constant, such as 1024, 2048, etc.), and where the 'L' field indicates a number of levels with a voxel reduction factor indicated by the 'N' field. X is selected to be a multiple of LxN. For example, for 128K rule book lines to be processed with 2 levels and reduction factor of one fourth (e.g., N=4), tsrc3 will be 0x80040204. For example, the source and destination addresses are passed to the memory interface of the AdMAC (e.g., block 310 from FIG. 3) and the RXLN information is used to configure the computation by the hash map computation block (e.g., block 330 from FIG. 3).

An embodiment of an AdMAC instruction for metadata creation may have a nominal mnemonic of METACOM-PRB. For example, execution of the METACOMPRB instruction may cause a processor to utilize the AdMAC to perform a metadata computation from a rulebook for spatially sparse data. An example format of the instruction is: METACOMPRB <tsrcdest>, <tsrc1>, <tsrc2>, <tsrc3>; where tsrcdest is a destination operand that points to an output rulebook base address, tsrc1 is a source operand that represents a base address of an input voxel list, tsrc2 is a source operand that represents a base address of a hash-map, and tsrc3 is a source operand that carries the configuration "RXLN", as previously described. For example, the source and destination addresses are passed to the memory interface of the AdMAC (e.g., block 310 from FIG. 3), the RXLN information is used to configure the computation by the hash map computation block (e.g., block 330 from FIG. 3) and the metadata computation by the metadata creation block (e.g., block 350 in FIG. 3).

Another embodiment of an AdMAC instruction for metadata creation (e.g., from a hash-map) may have a nominal mnemonic of METACOMPAM. For example, execution of the METACOMPAM may cause a processor to utilize the AdMAC to perform an adjacency metadata computation for spatially sparse data. An example format of the instruction is: METACOMPAM <tsrcdest>, <tsrc1>, <tsrc2>, <tsrc3>; where tsrcdest is a destination operand that points to an output rulebook base address, tsrc1 is a source operand that represents a base address of an input voxel list, tsrc2 is a source operand that represents a base address of a hash-map, and tsrc3 is a source operand that carries the configuration "RVLN", as previously described. For example, the source and destination addresses are passed to the memory interface of the AdMAC (e.g., block 310 from FIG. 3), the RXLN information is used to configure the adjacency metadata computation by the metadata creation block (e.g., block 360 in FIG. 3).

Embodiments of the AdMAC and AdMAC instructions have applicability to a wide set of applications. For example, the hash table creation functionality of the AdMAC may be used in a variety of applications that require or benefit from dictionary building and hash-based access functions for multi-dimensional data (e.g., including virtual to physical address translation). Another example includes 3D AI applications and/or 3D graphics applications that require or benefit from frequent lookup of neighbor voxels, normal estimation, estimation of several point cloud descriptors, correspondence search between voxel grids for registration, performing spatial neighbor searches, 3D voxel/point traversal based techniques for segmentation (graph cut-based methods, connected component labelling approaches), voxel integration procedures can benefit from this application. Another example includes ray tracing applications that require or benefit from screen space pixel to input pixel/voxel mapping. For such ray tracing applications, a hash-map created by an AdMAC may help in accessing the data efficiently and faster, thereby accelerating ray tracing implementations.

Figure 6:
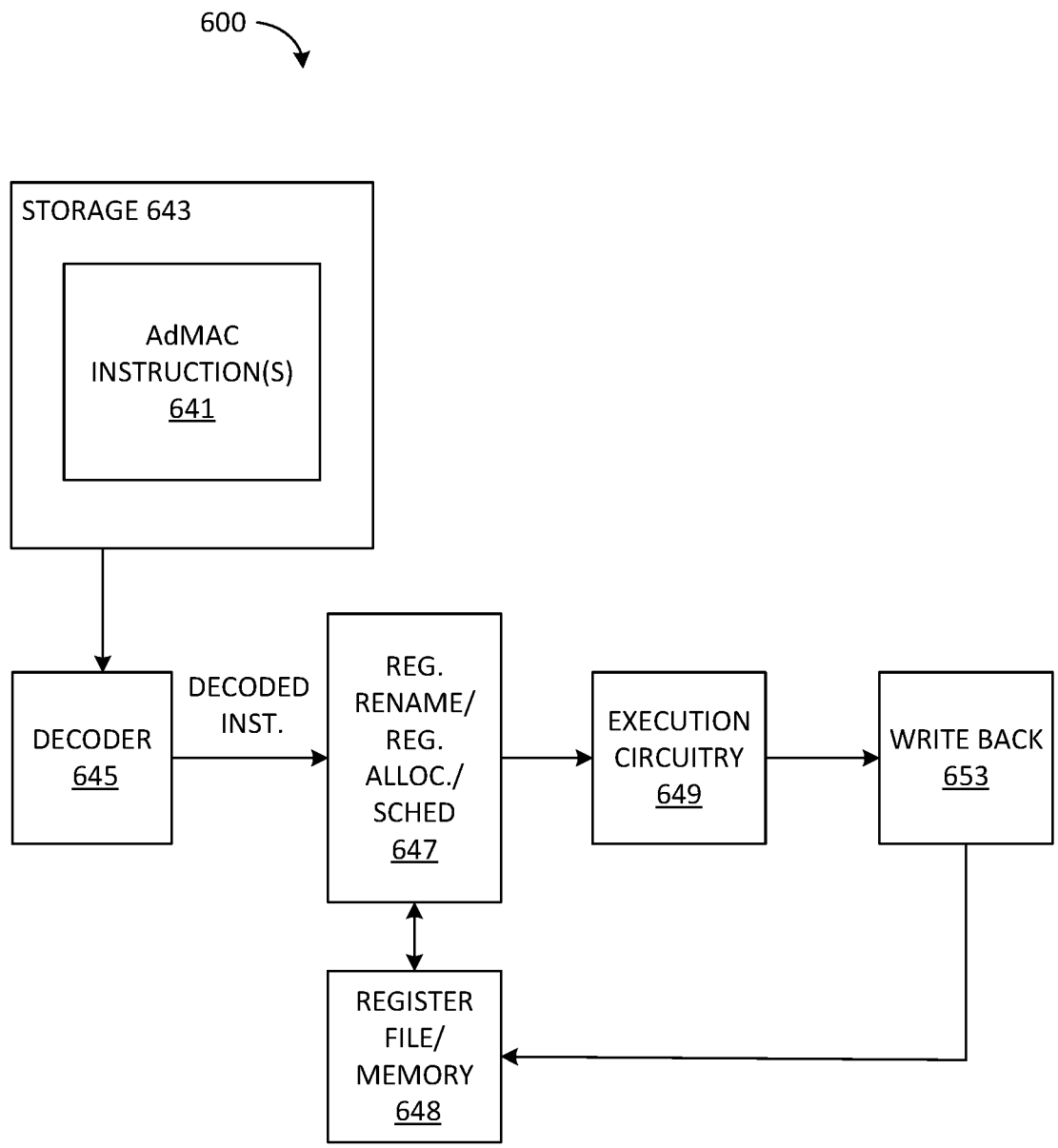
FIG. 6 is a block diagram of an example of hardware according to an embodiment.

FIG. 6 illustrates an embodiment of hardware 600 to process instructions such as AdMAC instructions (e.g., HASHMAPCOMP, METACOMPRB, METACOMPAM, etc.). As illustrated, storage 643 stores one or more AdMAC instructions 641 to be executed. Decoder circuitry 645 may be configured to decode a single instruction, the single instruction to include respective fields for one or more source operands, one or more destination operands, and an opcode, the opcode to indicate execution circuitry is to perform a 3D point cloud data access operation with a hardware accelerator.

One of the AdMAC instructions 641 is received by decoder circuitry 645. For example, the decoder circuitry 645 receives this instruction from fetch logic/circuitry. The instruction includes fields for an opcode, one or more source(s), and one or more destination(s). In some embodiments, the source(s) and destination(s) are registers, and in other embodiments one or more are memory locations. In some embodiments, the opcode details which AdMAC operation is to be performed.

The decoder circuitry 645 decodes the instruction into one or more operations. In some embodiments, this decoding includes generating a plurality of micro-operations to be performed by execution circuitry (such as execution circuitry 649). The decoder circuitry 645 also decodes instruction prefixes.

In some embodiments, register renaming, register allocation, and/or scheduling circuitry 647 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 648 store data as operands of the instruction to be operated on by execution circuitry 649. Exemplary register types include packed data registers, general purpose registers, and floating point registers.

Execution circuitry 649 executes the decoded instruction. Exemplary detailed execution circuitry is shown in FIG. 8B, etc. The execution of the decoded instruction causes the execution circuitry 649 to execute the decoded instruction according to the opcode. For some AdMAC instructions, for example, the execution of the decoded instruction causes the execution circuitry 649 to retrieve information from respective locations indicated by the one or more source operands, to perform the 3D point cloud access operation with the hardware accelerator on data indicated by the retrieved information, and to store respective results of the 3D point cloud access operation at one or more locations indicated by the one or more destination operands.

An embodiment of a format for an AdMAC instruction is AdMAC_MNEMONIC <DSTREGS>, <SRCREGS>. In some embodiments, AdMAC_MNEMONIC is the opcode mnemonic of the instruction. DSTREGS is one or more fields for the destination operand(s) to indicate the result registers, or to indicate one or more memory locations that store the respective results (e.g., or pointers thereto). SRCREGS is one or more field(s) for a source operand to indicate one or more source registers for the operation or one or more memory locations that store the respective source registers (e.g., or pointers thereto).

For some AdMAC instructions, the execution circuitry 649 is further to execute the decoded instruction according to the opcode to perform a hash-map computation operation with the hardware accelerator. For a HASHMAPCOMP instruction, for example, the execution circuitry 649 is further to execute the decoded instruction according to the opcode to perform the hash-map computation operation with the hardware accelerator based on a list of voxels indicated by a first source operand and configuration information indicated by a second source operand, and to store an output hash-map from the hardware accelerator at an address indicated by a destination operand.

For some AdMAC instructions, the execution circuitry 649 is further to execute the decoded instruction according to the opcode to perform a rulebook metadata computation operation with the hardware accelerator. For a METACOMPRB instruction, for example, the execution circuitry 649 is further to execute the decoded instruction according to the opcode to perform the rulebook metadata computation operation with the hardware accelerator based on a list of voxels indicated by a first source operand, a hash-map indicated by a second source operand, and configuration information indicated by a third source operand, and to store output rulebook information from the hardware accelerator at an address indicated by a destination operand.

For some AdMAC instructions, the execution circuitry 649 is further to execute the decoded instruction according to the opcode to perform a rulebook adjacency map computation operation with the hardware accelerator. For a METACOMPAM instruction, for example, the execution circuitry 649 is further to execute the decoded instruction according to the opcode to perform the rulebook adjacency map computation operation with the hardware accelerator based on a list of voxels indicated by a first source operand, a hash-map indicated by a second source operand, and configuration information indicated by a third source operand, and to store output rulebook information from the hardware accelerator at an address indicated by a destination operand.

In some embodiments, retirement/write back circuitry 653 architecturally commits the destination register into the registers or memory 648 and retires the instruction.

Figure 7A:
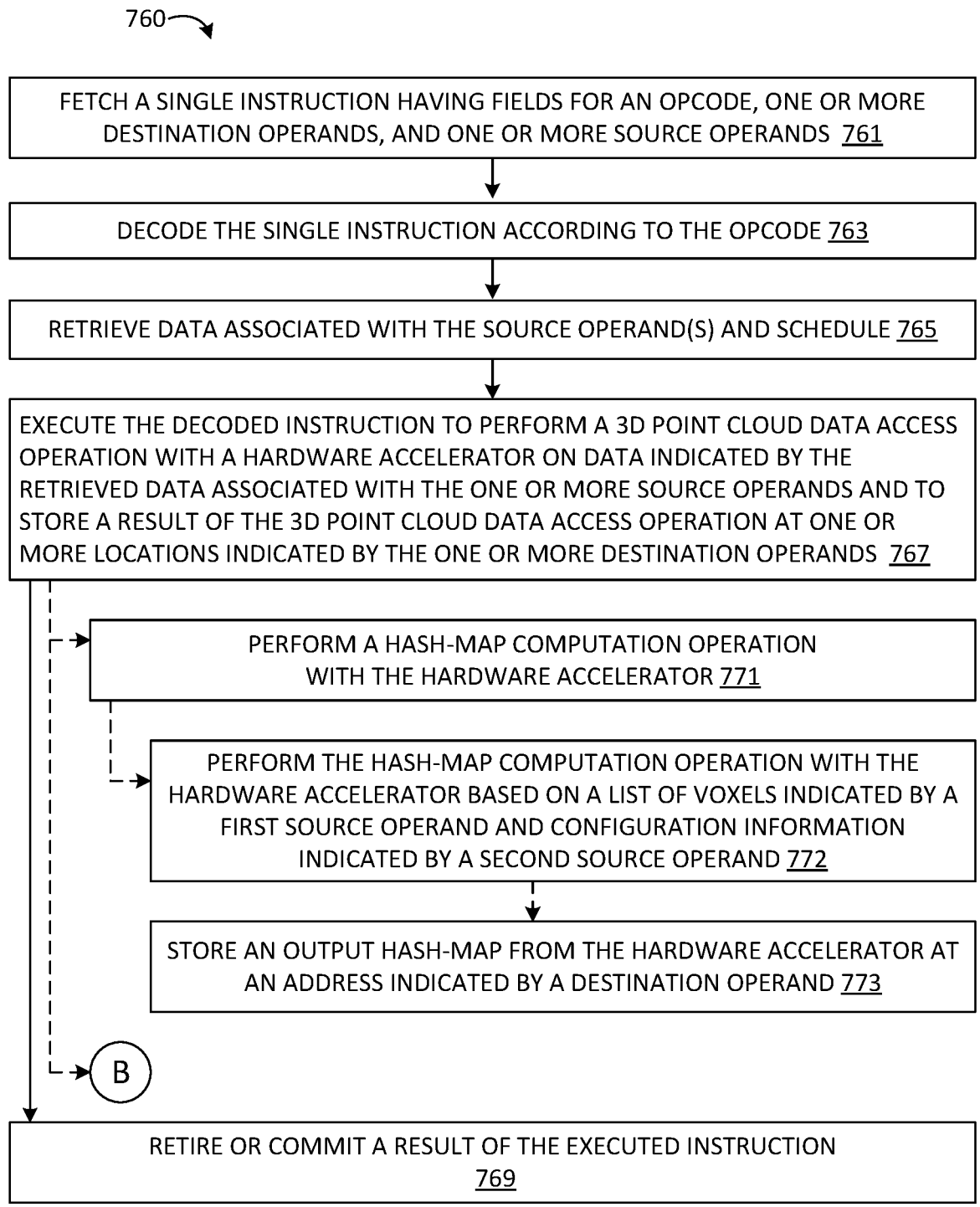
FIGS. 7A to 7B are flow diagrams of an example of a method according to an embodiment.
Figure 7B:
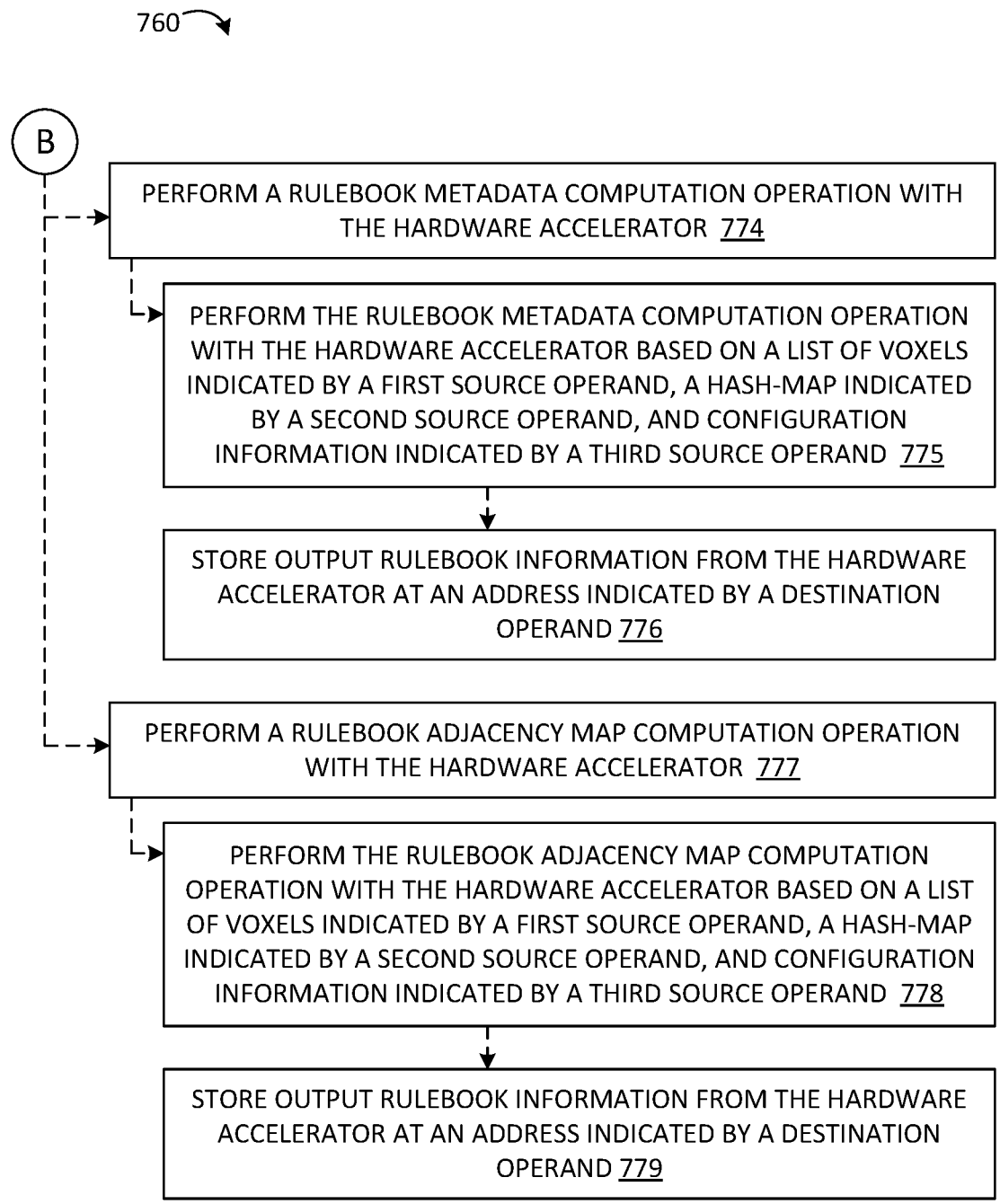

FIGS. 7A to 7B illustrate an embodiment of method 760 performed by a processor to process AdMAC instructions. For example, a processor core as shown in FIG. 8B, a pipeline as detailed below, etc., performs this method.

At 761, an instruction is fetched. For example, a single AdMAC instruction is fetched. The single instruction includes fields for an opcode, one or more destination operands, and one or more source operands. In some embodiments, the instruction further includes a field for a write mask. In some embodiments, the instruction is fetched from an instruction cache. The source operand(s) and destination operand(s) are packed data. The opcode of the AdMAC instruction indicates which AdMAC operation (e.g., HASHMAPCOMP, METACOMPRB, METACOMPAM, etc.) to perform.

The fetched instruction is decoded according to the opcode at 763. For example, the fetched AdMAC instruction is decoded by decode circuitry such as that detailed herein.

Data values associated with the source operands of the decoded instruction are retrieved and execution of the decoded instruction is scheduled at 765. For example, when one or more of the source operands are memory operands, the data from the indicated memory location is retrieved.

At 767, the decoded instruction is executed by execution circuitry (hardware) such as that detailed herein. For the AdMAC instruction, the execution will cause execution circuitry to perform a 3D point cloud data access operation with a hardware accelerator on data indicated by the retrieved data associated with the one or more source operands and to store a result of the 3D point cloud data access operation at one or more locations indicated by the one or more destination operands.

In some embodiments, the instruction is committed or retired at 769.

In some embodiments, the execution of the decoded AdMAC instruction will cause the execution circuitry to perform a hash-map computation operation with the hardware accelerator at 771. For example, the execution of a decoded HASHMAPCOMP instruction will cause the execution circuitry to perform the hash-map computation operation with the hardware accelerator based on a list of voxels indicated by a first source operand and configuration information indicated by a second source operand at 772, and to store an output hash-map from the hardware accelerator at an address indicated by a destination operand at 773.

In some embodiments, the execution of the decoded AdMAC instruction will cause the execution circuitry to perform a rulebook metadata computation operation with the hardware accelerator at 774. For example, execution of the decoded METACOMPRB instruction will cause the execution circuitry to perform the rulebook metadata computation operation with the hardware accelerator based on a list of voxels indicated by a first source operand, a hash-map indicated by a second source operand, and configuration information indicated by a third source operand at 775, and to store output rulebook information from the hardware accelerator at an address indicated by a destination operand at 776.

In some embodiments, the execution of the decoded AdMAC instruction will cause the execution circuitry to perform a rulebook adjacency map computation operation with the hardware accelerator at 777. For example, the execution of the decoded MATACOMPAM instruction will cause the execution circuitry to perform the rulebook adjacency map computation operation with the hardware accelerator based on a list of voxels indicated by a first source operand, a hash-map indicated by a second source operand, and configuration information indicated by a third source operand at 778, and to store output rulebook information from the hardware accelerator at an address indicated by a destination operand at 779.

Figure 7C:
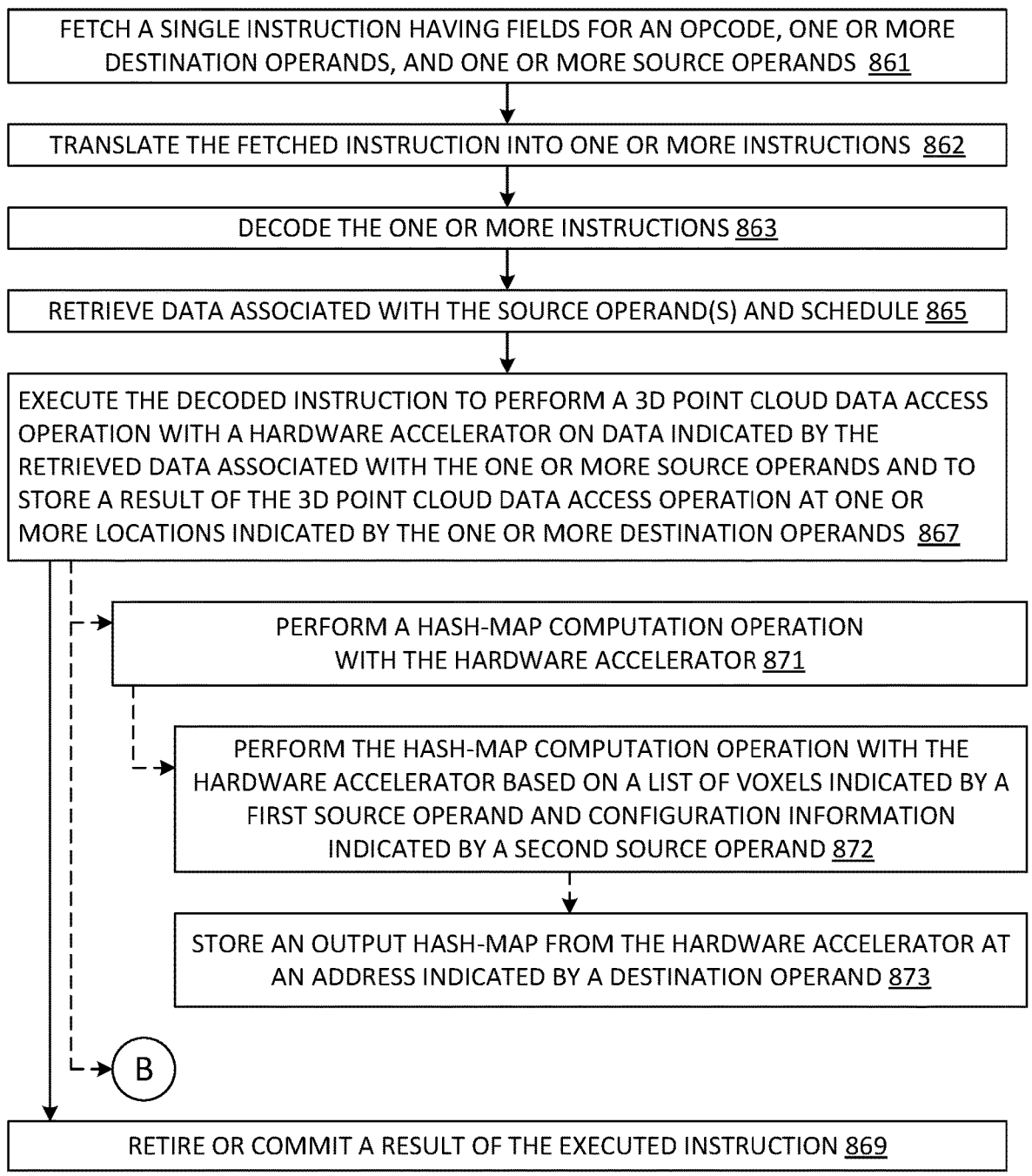
FIGS. 7C to 7D are flow diagrams of another example of a method according to an embodiment.
Figure 7D:
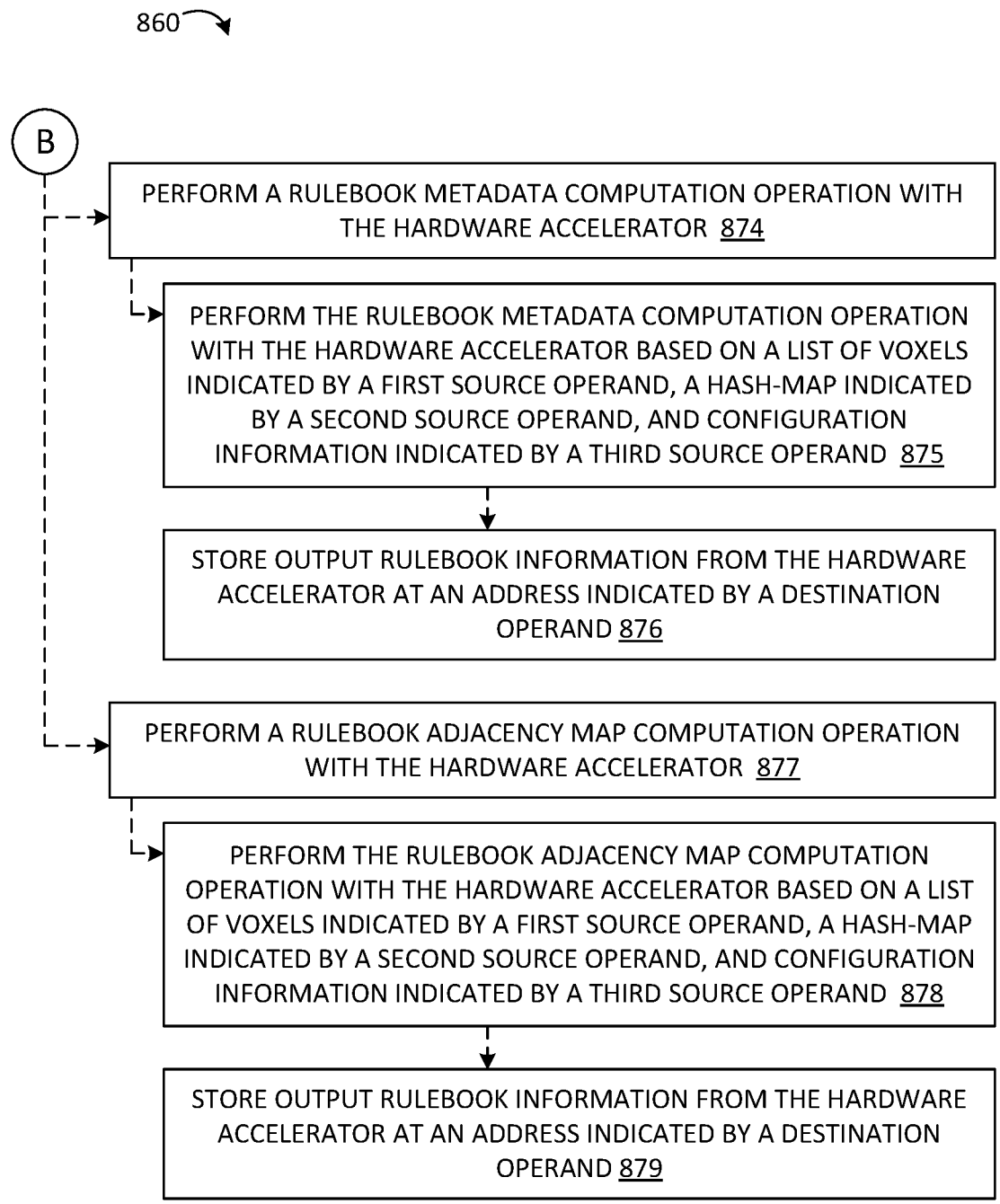

FIGS. 7C to 7D illustrate an embodiment of method 860 performed by a processor to process an AdMAC instruction using emulation or binary translation. For example, a processor core as shown in FIG. 8B, a pipeline as detailed below, etc. performs this method.

At 861, an instruction is fetched. For example, an AdMAC instruction is fetched. The AdMAC instruction includes a single instruction having fields for an opcode, one or more destination operands, and one or more source operands. In some embodiments, the instruction further includes a field for a write mask. In some embodiments, the instruction is fetched from an instruction cache. The source operand(s) and destination operand(s) are packed data. The opcode of the AdMAC instruction indicates which AdMAC operation (e.g., HASHMAPCOMP, METACOMPRB, METACOMPAM, etc.) to perform.

The fetched instruction of the first instruction set is translated into one or more instructions of a second instruction set at 862.

The one or more translated instructions of the second instruction set are decoded at 863. In some embodiments, the translation and decoding are merged.

Data values associated with the source operands of the decoded instruction(s) are retrieved and execution of the decoded instruction(s) is scheduled at 865. For example, when one or more of the source operands are memory operands, the data from the indicated memory location is retrieved.

At 867, the decoded instruction(s) is executed by execution circuitry (hardware) such as that detailed herein. For the AdMAC instruction, the execution will cause execution circuitry to perform a 3D point cloud data access operation with a hardware accelerator on data indicated by the retrieved data associated with the one or more source operands and to store a result of the 3D point cloud data access operation at one or more locations indicated by the one or more destination operands.

In some embodiments, the instruction is committed or retired at 869.

In some embodiments, the execution of the decoded AdMAC instruction will cause the execution circuitry to perform a hash-map computation operation with the hardware accelerator at 871. For example, the execution of a decoded HASHMAPCOMP instruction will cause the execution circuitry to perform the hash-map computation operation with the hardware accelerator based on a list of voxels indicated by a first source operand and configuration information indicated by a second source operand at 872, and to store an output hash-map from the hardware accelerator at an address indicated by a destination operand at 873.

In some embodiments, the execution of the decoded AdMAC instruction will cause the execution circuitry to perform a rulebook metadata computation operation with the hardware accelerator at 874. For example, execution of the decoded METACOMPRB instruction will cause the execution circuitry to perform the rulebook metadata computation operation with the hardware accelerator based on a list of voxels indicated by a first source operand, a hash-map indicated by a second source operand, and configuration information indicated by a third source operand at 875, and to store output rulebook information from the hardware accelerator at an address indicated by a destination operand at 876.

In some embodiments, the execution of the decoded AdMAC instruction will cause the execution circuitry to perform a rulebook adjacency map computation operation with the hardware accelerator at 877. For example, the execution of the decoded MATACOMPAM instruction will cause the execution circuitry to perform the rulebook adjacency map computation operation with the hardware accelerator based on a list of voxels indicated by a first source operand, a hash-map indicated by a second source operand, and configuration information indicated by a third source operand at 878, and to store output rulebook information from the hardware accelerator at an address indicated by a destination operand at 879.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9A:
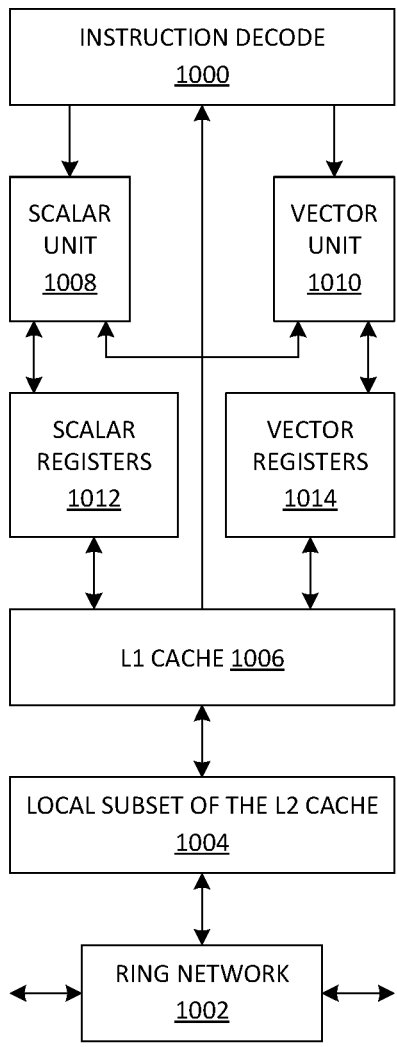
FIGS. 9A-B illustrate a block diagram of a more specific exemplary in-order core architecture, which core would be one of several logic blocks (including other cores of the same type and/or different types) in a chip.
Figure 9B:
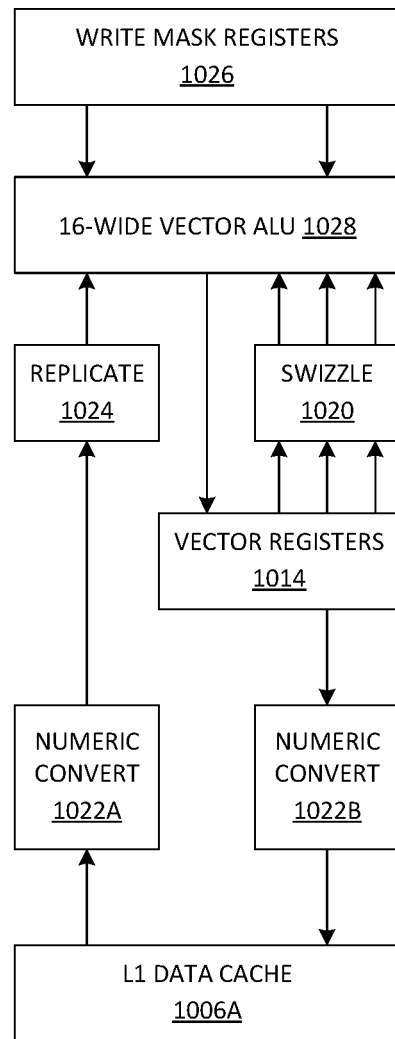

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 10:
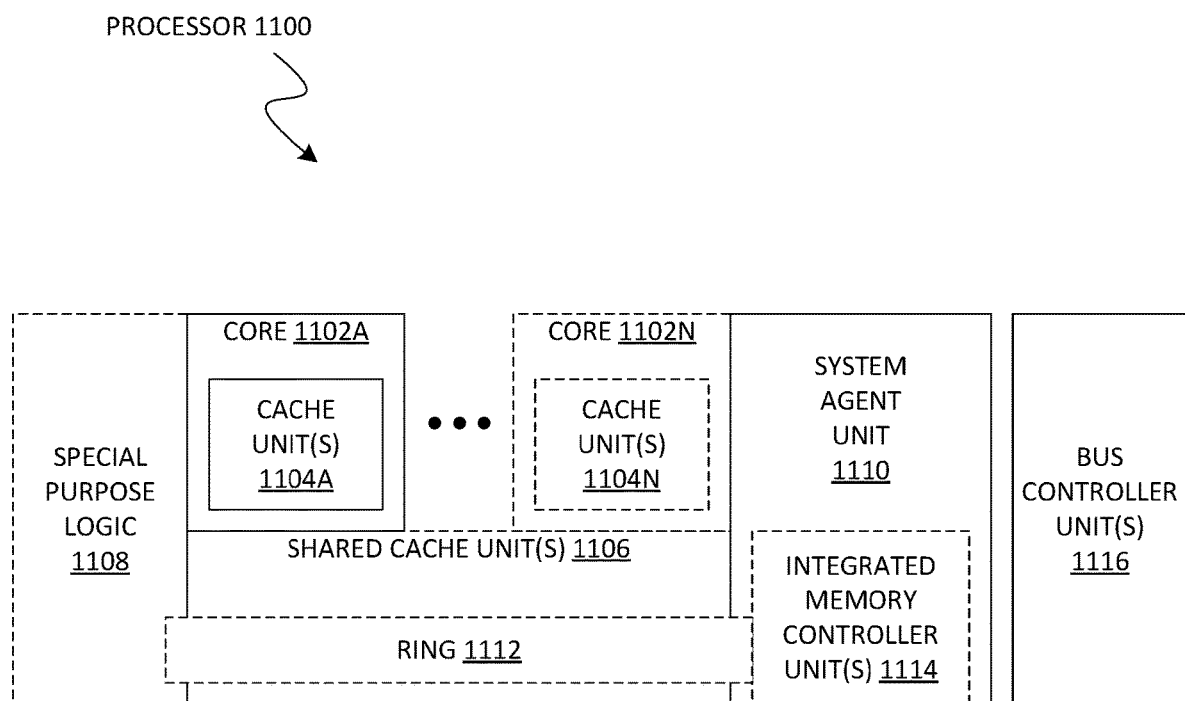
FIG. 10 is a block diagram of a processor that may have more than one core, may have an integrated memory controller, and may have integrated graphics according to embodiments of the invention.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
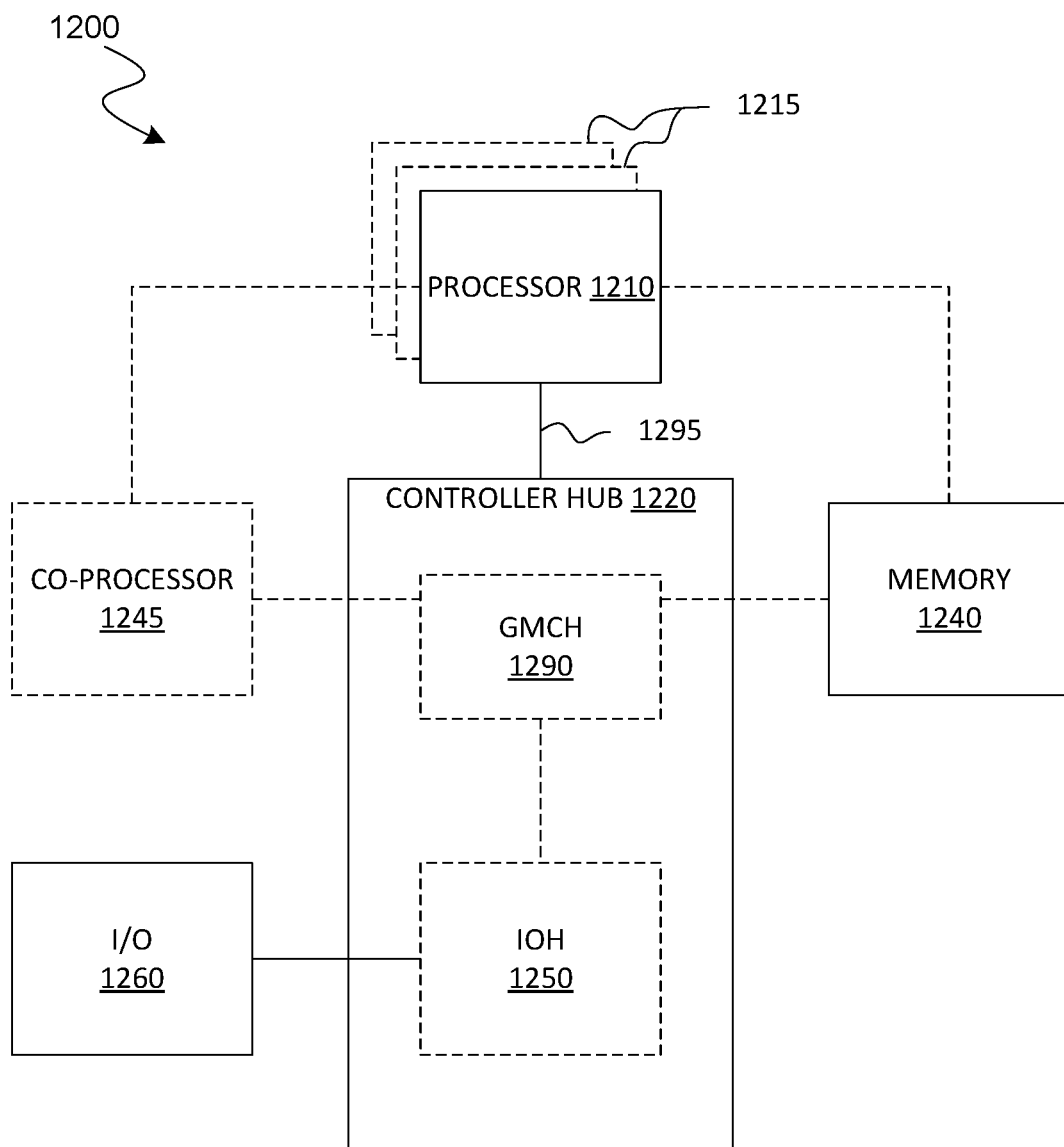
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
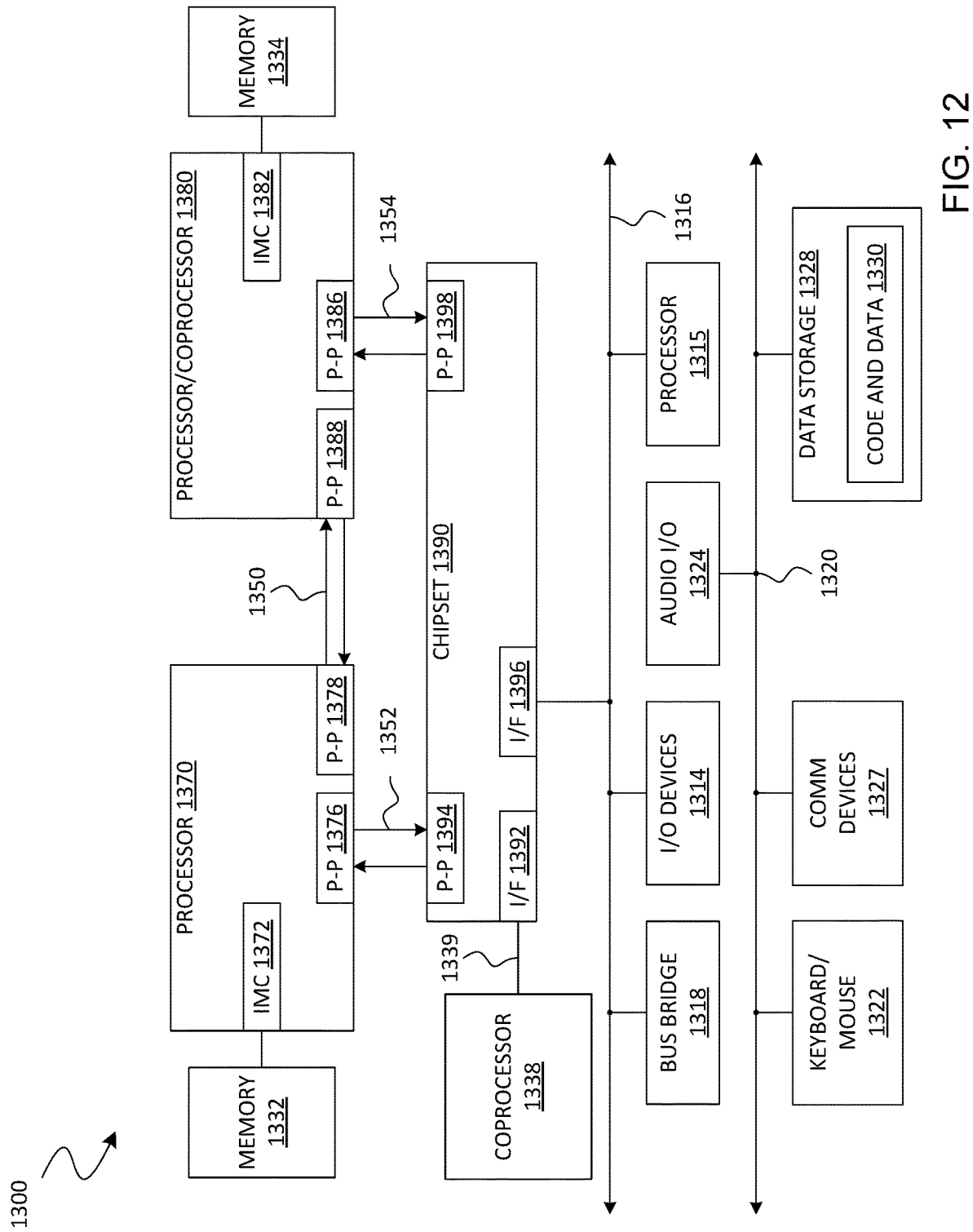

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Figure 13:
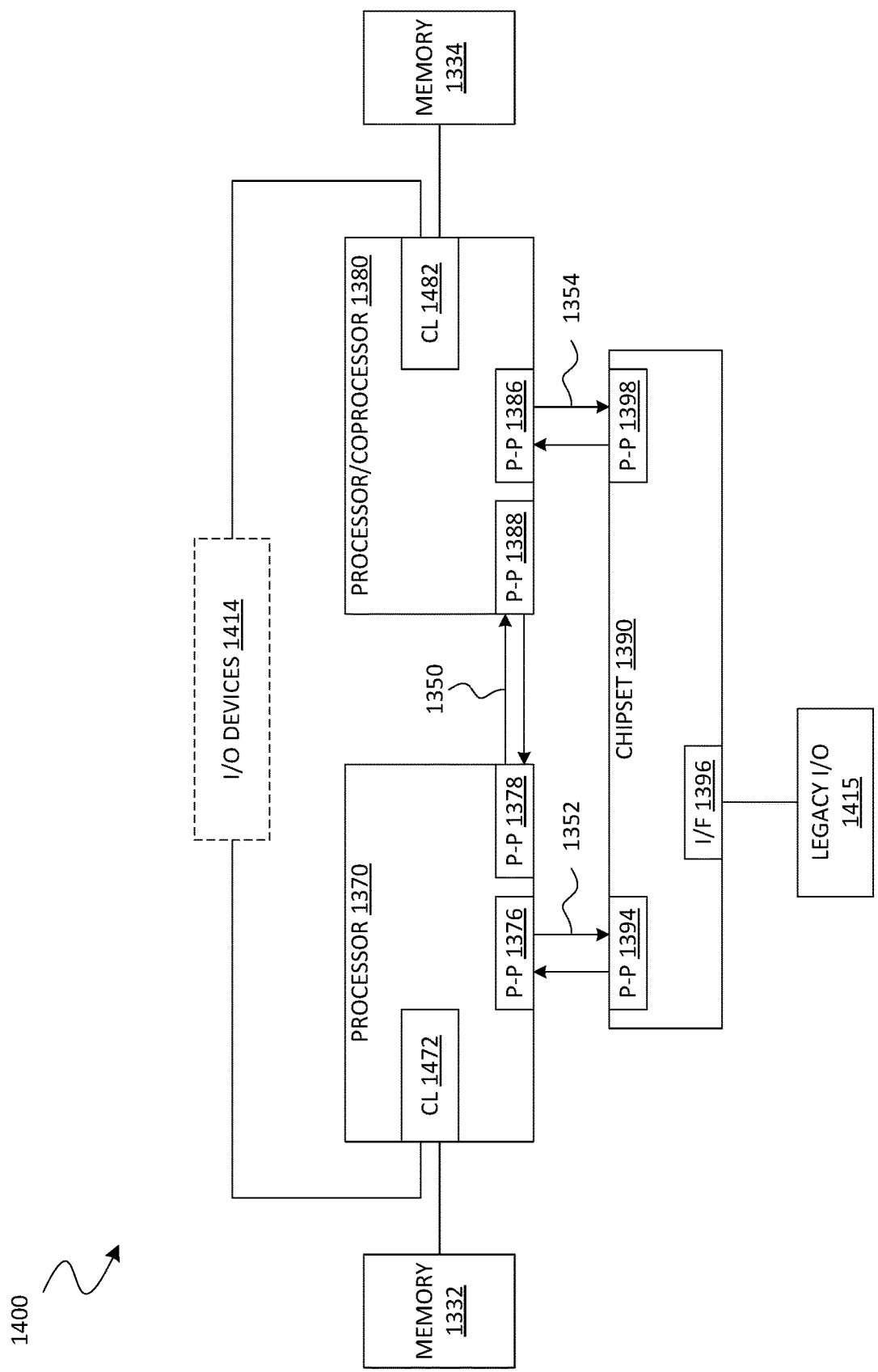

Referring now to FIG. 13, shown is a block diagram of a second more specific exemplary system 1400 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 14:
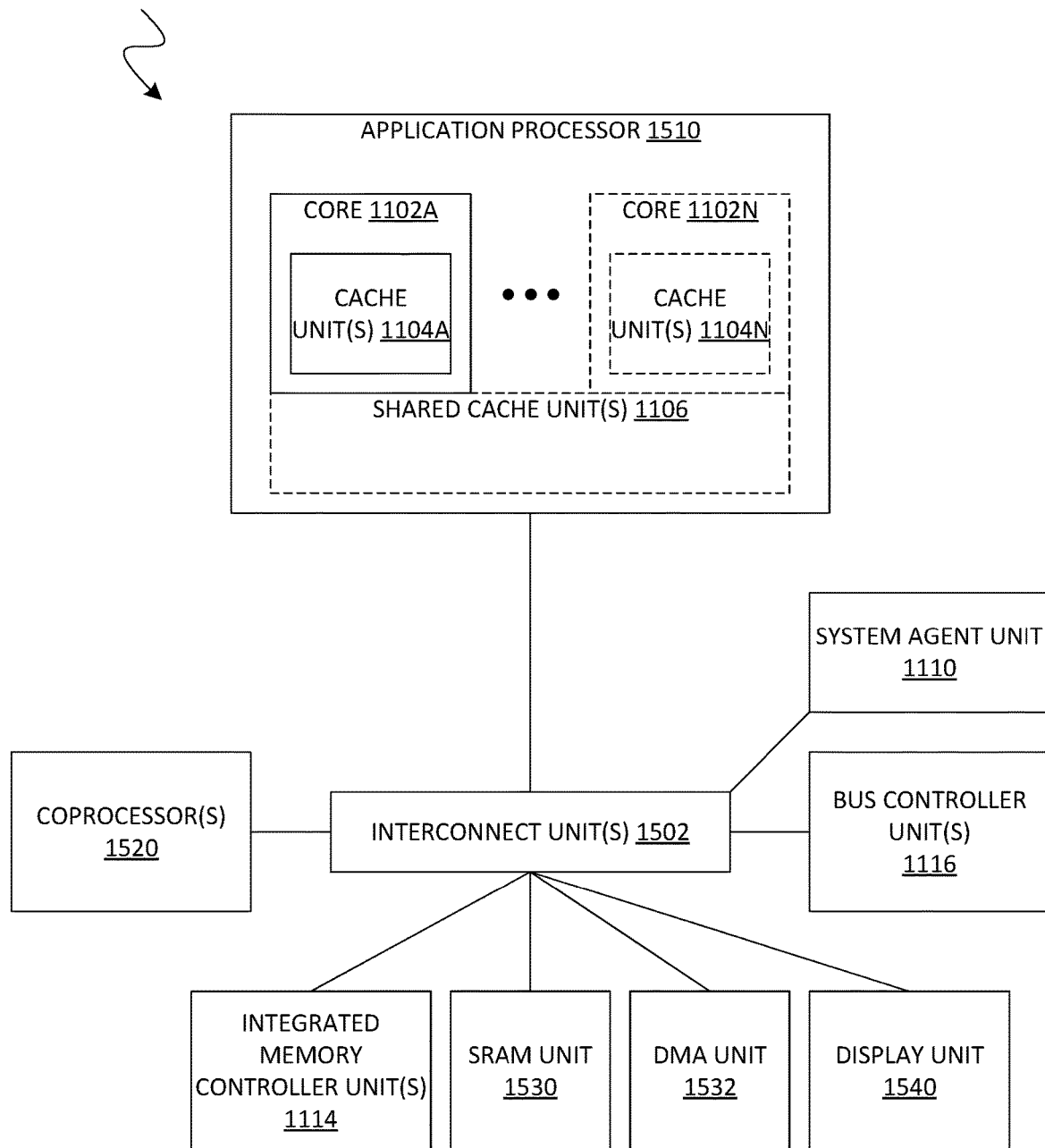

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
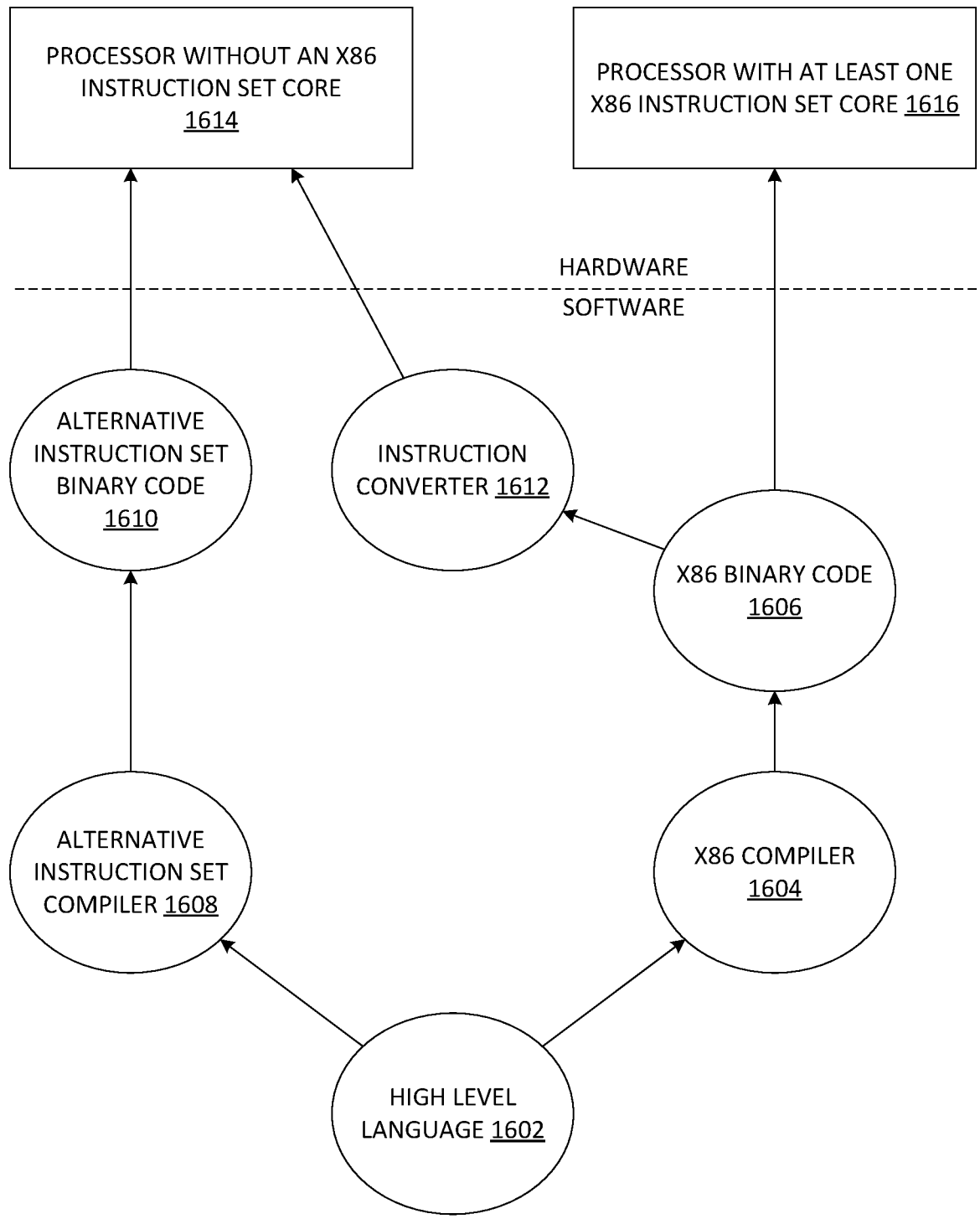
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for a point cloud adjacency-map and hash-map creation accelerator are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description

ADDITIONAL NOTES AND EXAMPLES

Example 1 includes an apparatus, comprising a hardware accelerator to perform a 3D point cloud data access operation, and first circuitry coupled to the hardware accelerator to control the hardware accelerator to perform the 3D point cloud data access operation in response to a request.

Example 2 includes the apparatus of Example 1, wherein the hardware accelerator includes second circuitry to provide N-dimension to one-dimension hash-map creation and metadata generation for the 3D point cloud data, where N is greater than one.

Example 3 includes the apparatus of Example 2, wherein the second circuitry is further to create a hash-map with memory banks based on a format of the 3D point cloud data.

Example 4 includes the apparatus of Example 3, wherein the second circuitry is further to create hierarchical metadata storage for voxels, and create an adjacency map metadata for multi-dimensional visual analytics.

Example 5 includes the apparatus of Example 4, wherein the first circuitry is further to perform a hash-map computation operation with the hardware accelerator based on a list of voxels and configuration information indicated by the request, and store an output hash-map from the hardware accelerator at an address indicated by the request.

Example 6 includes the apparatus of any of Examples 4 to 5, wherein the first circuitry is further to perform a rulebook metadata computation operation with the hardware accelerator based on a list of voxels, a hash-map, and configuration information indicated by the request, and store output rulebook information from the hardware accelerator at an address indicated by the request.

Example 7 includes the apparatus of any of Examples 4 to 6, wherein the first circuitry is further to perform a rulebook adjacency map computation operation with the hardware accelerator based on a list of voxels, a hash-map, and configuration information indicated by the request, and store output rulebook information from the hardware accelerator at an address indicated by the request.

Example 8 includes an apparatus comprising decode circuitry to decode a single instruction, the single instruction to include respective fields for one or more source operands, one or more destination operands, and an opcode, the opcode to indicate execution circuitry is to perform a 3D point cloud data access operation with a hardware accelerator, and execution circuitry to execute the decoded instruction according to the opcode to retrieve information from respective locations indicated by the one or more source operands, to perform the 3D point cloud data access operation with the hardware accelerator on data indicated by the retrieved information, and to store respective results of the 3D point cloud data access operation at one or more locations indicated by the one or more destination operands.

Example 9 includes the apparatus of Example 8, wherein the execution circuitry is further to execute the decoded instruction according to the opcode to perform a hash-map computation operation with the hardware accelerator.

Example 10 includes the apparatus of Example 9, wherein the execution circuitry is further to execute the decoded instruction according to the opcode to perform the hash-map computation operation with the hardware accelerator based on a list of voxels indicated by a first source operand and configuration information indicated by a second source operand, and store an output hash-map from the hardware accelerator at an address indicated by a destination operand.

Example 11 includes the apparatus of any of Examples 8 to 10, wherein the execution circuitry is further to execute the decoded instruction according to the opcode to perform a rulebook metadata computation operation with the hardware accelerator.

Example 12 includes the apparatus of Example 11, wherein the execution circuitry is further to execute the decoded instruction according to the opcode to perform the rulebook metadata computation operation with the hardware accelerator based on a list of voxels indicated by a first source operand, a hash-map indicated by a second source operand, and configuration information indicated by a third source operand, and store output rulebook information from the hardware accelerator at an address indicated by a destination operand.

Example 13 includes the apparatus of any of Examples 8 to 12, wherein the execution circuitry is further to execute the decoded instruction according to the opcode to perform a rulebook adjacency map computation operation with the hardware accelerator.

Example 14 includes the apparatus of Example 13, wherein the execution circuitry is further to execute the decoded instruction according to the opcode to perform the rulebook adjacency map computation operation with the hardware accelerator based on a list of voxels indicated by a first source operand, a hash-map indicated by a second source operand, and configuration information indicated by a third source operand, and store output rulebook information from the hardware accelerator at an address indicated by a destination operand.

Example 15 includes a method, comprising fetching a single instruction having fields for an opcode, one or more destination operands, and one or more source operands, decoding the single instruction according to the opcode, retrieving data associated with the one or more source operands, scheduling execution of the instruction, and executing the decoded instruction to perform a 3D point cloud data access operation with a hardware accelerator on data indicated by the retrieved data associated with the one or more source operands and to store a result of the 3D point cloud data access operation at one or more locations indicated by the one or more destination operands.

Example 16 includes the method of Example 15, further comprising executing the decoded instruction to perform a hash-map computation operation with the hardware accelerator.

Example 17 includes the method of Example 16, further comprising executing the decoded instruction to perform the hash-map computation operation with the hardware accelerator based on a list of voxels indicated by a first source operand and configuration information indicated by a second source operand, and storing an output hash-map from the hardware accelerator at an address indicated by a destination operand.

Example 18 includes the method of any of Examples 15 to 17, further comprising executing the decoded instruction to perform a rulebook metadata computation operation with the hardware accelerator.

Example 19 includes the method of Example 18, further comprising executing the decoded instruction to perform the rulebook metadata computation operation with the hardware accelerator based on a list of voxels indicated by a first source operand, a hash-map indicated by a second source operand, and configuration information indicated by a third source operand, and storing output rulebook information from the hardware accelerator at an address indicated by a destination operand.

Example 20 includes the method of any of Examples 15 to 19, further comprising executing the decoded instruction to perform a rulebook adjacency map computation operation with the hardware accelerator.

Example 21 includes the method of Example 20, further comprising executing the decoded instruction to perform the rulebook adjacency map computation operation with the hardware accelerator based on a list of voxels indicated by a first source operand, a hash-map indicated by a second source operand, and configuration information indicated by a third source operand, and storing output rulebook information from the hardware accelerator at an address indicated by a destination operand.

Example 22 includes an apparatus, comprising means for fetching a single instruction having fields for an opcode, one or more destination operands, and one or more source operands, means for decoding the single instruction according to the opcode, means for retrieving data associated with the one or more source operands, means for scheduling execution of the instruction, and means for executing the decoded instruction to perform a 3D point cloud data access operation with a hardware accelerator on data indicated by the retrieved data associated with the one or more source operands and to store a result of the 3D point cloud data access operation at one or more locations indicated by the one or more destination operands.

Example 23 includes the apparatus of Example 22, further comprising means for executing the decoded instruction to perform a hash-map computation operation with the hardware accelerator.

Example 24 includes the apparatus of Example 23, further comprising means for executing the decoded instruction to perform the hash-map computation operation with the hardware accelerator based on a list of voxels indicated by a first source operand and configuration information indicated by a second source operand, and means for storing an output hash-map from the hardware accelerator at an address indicated by a destination operand.

Example 25 includes the apparatus of any of Examples 22 to 24, further comprising means for executing the decoded instruction to perform a rulebook metadata computation operation with the hardware accelerator.

Example 26 includes the apparatus of Example 25, further comprising means for executing the decoded instruction to perform the rulebook metadata computation operation with the hardware accelerator based on a list of voxels indicated by a first source operand, a hash-map indicated by a second source operand, and configuration information indicated by a third source operand, and means for storing output rulebook information from the hardware accelerator at an address indicated by a destination operand.

Example 27 includes the apparatus of any of Examples 22 to 26, further comprising means for executing the decoded instruction to perform a rulebook adjacency map computation operation with the hardware accelerator.

Example 28 includes the apparatus of Example 27, further comprising means for executing the decoded instruction to perform the rulebook adjacency map computation operation with the hardware accelerator based on a list of voxels indicated by a first source operand, a hash-map indicated by a second source operand, and configuration information indicated by a third source operand, and means for storing output rulebook information from the hardware accelerator at an address indicated by a destination operand.

Example 29 includes at least one non-transitory machine readable medium comprising a plurality of instructions that, in response to being executed on a computing device, cause the computing device to fetch a single instruction having fields for an opcode, one or more destination operands, and one or more source operands, decode the single instruction according to the opcode, retrieve data associated with the one or more source operands, schedule execution of the instruction, and execute the decoded instruction to perform a 3D point cloud data access operation with a hardware accelerator on data indicated by the retrieved data associated with the one or more source operands and to store a result of the 3D point cloud data access operation at one or more locations indicated by the one or more destination operands.

Example 30 includes the at least one non-transitory machine readable medium of Example 29, comprising a plurality of further instructions that, in response to being executed on the computing device, and in response to the single request, cause the computing device to execute the decoded instruction to perform a hash-map computation operation with the hardware accelerator.

Example 31 includes the at least one non-transitory machine readable medium of Example 30, comprising a plurality of further instructions that, in response to being executed on the computing device, and in response to the single request, cause the computing device to execute the decoded instruction to perform the hash-map computation operation with the hardware accelerator based on a list of voxels indicated by a first source operand and configuration information indicated by a second source operand, and store an output hash-map from the hardware accelerator at an address indicated by a destination operand.

Example 32 includes the at least one non-transitory machine readable medium of any of Examples 29 to 31, comprising a plurality of further instructions that, in response to being executed on the computing device, and in response to the single request, cause the computing device to execute the decoded instruction to perform a rulebook metadata computation operation with the hardware accelerator.

Example 33 includes the at least one non-transitory machine readable medium of Example 32, comprising a plurality of further instructions that, in response to being executed on the computing device, and in response to the single request, cause the computing device to execute the decoded instruction to perform the rulebook metadata computation operation with the hardware accelerator based on a list of voxels indicated by a first source operand, a hash-map indicated by a second source operand, and configuration information indicated by a third source operand, and store output rulebook information from the hardware accelerator at an address indicated by a destination operand.

Example 34 includes the at least one non-transitory machine readable medium of any of Examples 29 to 33, comprising a plurality of further instructions that, in response to being executed on the computing device, and in response to the single request, cause the computing device to execute the decoded instruction to perform a rulebook adjacency map computation operation with the hardware accelerator.

Example 35 includes the at least one non-transitory machine readable medium of Example 34, comprising a plurality of further instructions that, in response to being executed on the computing device, and in response to the single request, cause the computing device to execute the decoded instruction to perform the rulebook adjacency map computation operation with the hardware accelerator based on a list of voxels indicated by a first source operand, a hash-map indicated by a second source operand, and configuration information indicated by a third source operand, and store output rulebook information from the hardware accelerator at an address indicated by a destination operand.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   decode circuitry to decode a single instruction to generate a decoded instruction, the single instruction to include respective fields for one or more source operands, one or more destination operands, and an opcode; and
   execution circuitry coupled to the decode circuitry, wherein the opcode is to indicate that the execution circuitry is to perform a three-dimensional (3D) point cloud data access operation with a hardware accelerator, wherein the execution circuitry is to execute the decoded instruction according to the opcode to retrieve first information from respective locations indicated by the one or more source operands, to perform the 3D point cloud data access operation with the hardware accelerator on data indicated by the first information, and to store respective results of the 3D point cloud data access operation at one or more locations indicated by the one or more destination operands.

2. The apparatus of claim 1, wherein the execution circuitry is further to execute the decoded instruction according to the opcode to:
   perform a hash-map computation operation with the hardware accelerator.

3. The apparatus of claim 2, wherein the execution circuitry is further to execute the decoded instruction according to the opcode to:
   perform the hash-map computation operation with the hardware accelerator based on a list of voxels indicated by a first source operand and configuration information indicated by a second source operand; and
   store an output hash-map from the hardware accelerator at an address indicated by the one or more destination operands.

4. The apparatus of claim 1, wherein the execution circuitry is further to execute the decoded instruction according to the opcode to:
   perform a rulebook metadata computation operation with the hardware accelerator.

5. The apparatus of claim 4, wherein the execution circuitry is further to execute the decoded instruction according to the opcode to:
   perform the rulebook metadata computation operation with the hardware accelerator based on a list of voxels indicated by a first source operand, a hash-map indicated by a second source operand, and configuration information indicated by a third source operand; and
   store output rulebook information from the hardware accelerator at an address indicated by the one or more destination operands.

6. The apparatus of claim 1, wherein the execution circuitry is further to execute the decoded instruction according to the opcode to:
   perform a rulebook adjacency map computation operation with the hardware accelerator.

7. The apparatus of claim 6, wherein the execution circuitry is further to execute the decoded instruction according to the opcode to:
   perform the rulebook adjacency map computation operation with the hardware accelerator based on a list of voxels indicated by a first source operand, a hash-map indicated by a second source operand, and configuration information indicated by a third source operand; and
   store output rulebook information from the hardware accelerator at an address indicated by the one or more destination operands.

8. A system comprising:
   a processor comprising:
      decode circuitry to decode a single instruction to generate a decoded instruction, the single instruction to include respective fields for one or more source operands, one or more destination operands, and an opcode; and
      execution circuitry coupled to the decode circuitry, wherein the opcode is to indicate that the execution circuitry is to perform a three-dimensional (3D) point cloud data access operation with a hardware accelerator, wherein the execution circuitry is to execute the decoded instruction according to the opcode to retrieve first information from respective locations indicated by the one or more source operands, to perform the 3D point cloud data access operation with the hardware accelerator on data indicated by the first information, and to store respective results of the 3D point cloud data access operation at one or more locations indicated by the one or more destination operands; and
   a memory coupled to the processor, the memory to provide the first information.

9. The system of claim 8, wherein the execution circuitry is further to execute the decoded instruction according to the opcode to:
perform a hash-map computation operation with the hardware accelerator.

10. The system of claim 9, wherein the execution circuitry is further to execute the decoded instruction according to the opcode to:
perform the hash-map computation operation with the hardware accelerator based on a list of voxels indicated by a first source operand and configuration information indicated by a second source operand; and
store an output hash-map from the hardware accelerator at an address indicated by the one or more destination operands.

11. The system of claim 8, wherein the execution circuitry is further to execute the decoded instruction according to the opcode to:
perform a rulebook metadata computation operation with the hardware accelerator.

12. The system of claim 11, wherein the execution circuitry is further to execute the decoded instruction according to the opcode to:
perform the rulebook metadata computation operation with the hardware accelerator based on a list of voxels indicated by a first source operand, a hash-map indicated by a second source operand, and configuration information indicated by a third source operand; and
store output rulebook information from the hardware accelerator at an address indicated by the one or more destination operands.

13. The system of claim 8, wherein the execution circuitry is further to execute the decoded instruction according to the opcode to:
perform a rulebook adjacency map computation operation with the hardware accelerator.

14. The system of claim 13, wherein the execution circuitry is further to execute the decoded instruction according to the opcode to:
perform the rulebook adjacency map computation operation with the hardware accelerator based on a list of voxels indicated by a first source operand, a hash-map indicated by a second source operand, and configuration information indicated by a third source operand; and
store output rulebook information from the hardware accelerator at an address indicated by the one or more destination operands.

* * * * *